US006975546B2

(12) United States Patent
Tsukada

(10) Patent No.: US 6,975,546 B2
(45) Date of Patent: Dec. 13, 2005

(54) SIGNAL LINE DRIVER CIRCUIT WHICH REDUCES POWER CONSUMPTION AND ENABLES HIGH-SPEED DATA TRANSFER

(75) Inventor: Shuichi Tsukada, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 0 days.

(21) Appl. No.: 10/960,627

(22) Filed: Oct. 8, 2004

(65) Prior Publication Data

US 2005/0117440 A1 Jun. 2, 2005

(30) Foreign Application Priority Data

Oct. 10, 2003 (JP) ............................ 2003-352501

(51) Int. Cl.[7] ................................................. G11C 7/00
(52) U.S. Cl. ................................. 365/189.01; 365/190
(58) Field of Search .......................... 365/189.01, 190, 365/191, 230.06

(56) References Cited

U.S. PATENT DOCUMENTS 6,233,197 B1 * 5/2001 Agrawal et al. ....... 365/230.05
6,788,106 B2 * 9/2004 Kwak et al. .................. 326/52

FOREIGN PATENT DOCUMENTS

| | | |
|---|---|---|
| JP | 7-169843 | 7/1995 |
| JP | 2647344 | 5/1997 |
| JP | 11-195296 | 7/1999 |
| JP | 2001-144620 | 5/2001 |
| JP | 2002-25265 | 1/2002 |
| JP | 2003-7823 | 1/2003 |

* cited by examiner

*Primary Examiner*—Vu A. Le
(74) *Attorney, Agent, or Firm*—Young & Thompson

(57) ABSTRACT

A signal line drive circuit is capable of reducing the charge consumption in a circuit device, and further, transferring data at high speed. A determination circuit determines whether the present signals of a first signal line and a second signal line are the same or not. A control circuit selects a drive procedure that results in less charge and discharge current of the coupling capacitance between the first signal line and the second signal line depending on whether the present signals of the first signal line and the second signal line are the same or not. A signal line drive circuit drives the first signal line and the second signal line in accordance with the drive procedure that has been selected at the control circuit and supplies signals as output.

17 Claims, 20 Drawing Sheets

Fig. 3 (Prior Art)
(A)
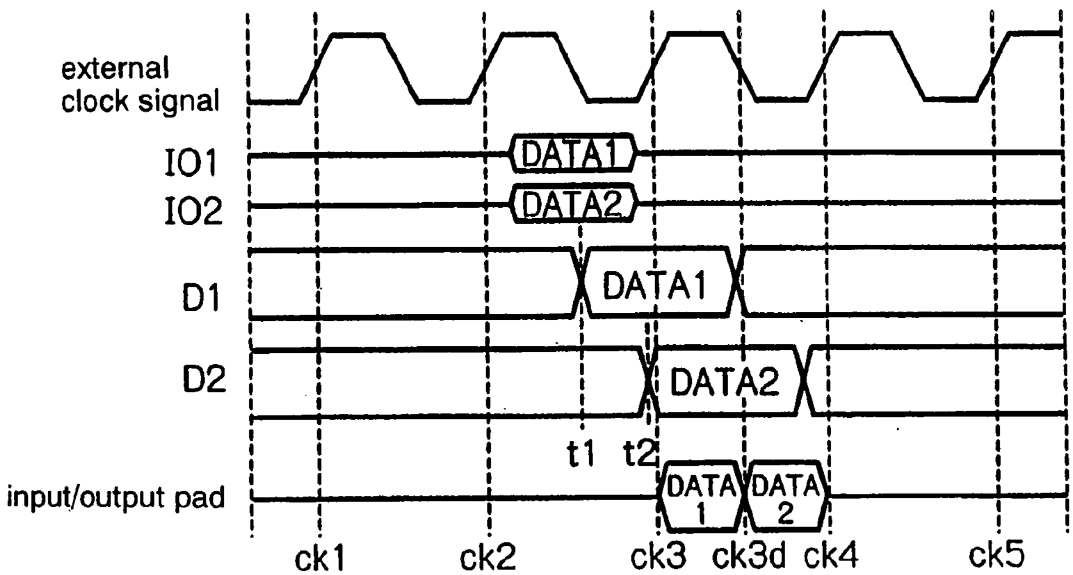
(B)
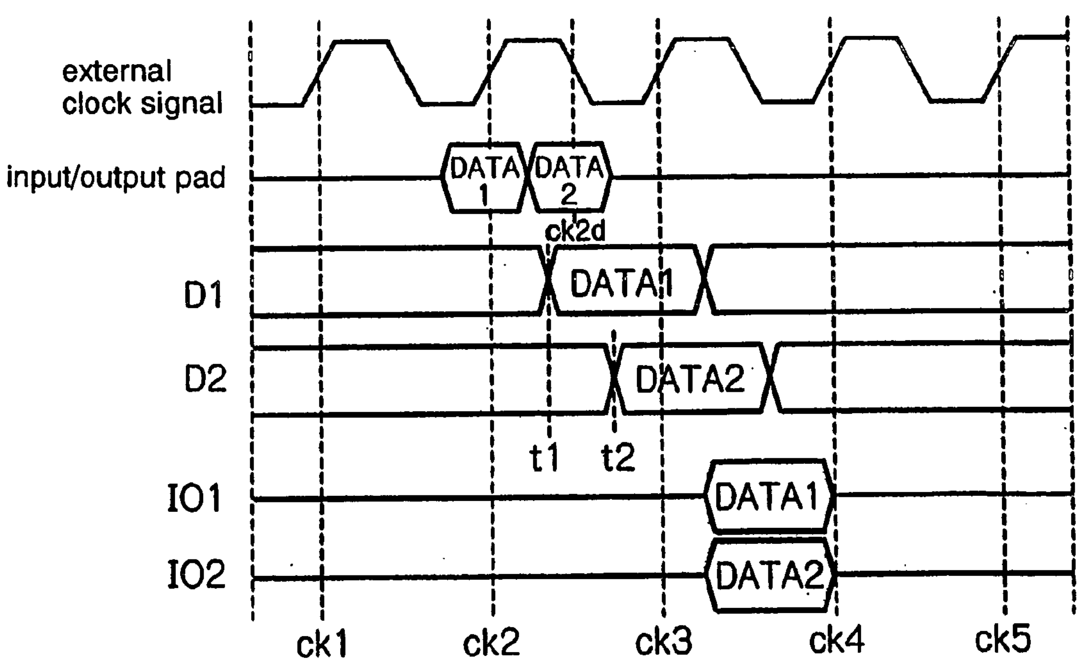

| No. | D1 | | D2 | | consumed charge |
|---|---|---|---|---|---|
| | N | N+1 | N | N+1 | |
| 1 | L | L | L | L | 0·CV |
| 2 | L | L | L | H | 1·CV |
| 3 | L | L | H | L | 0·CV |
| 4 | L | L | H | H | 0·CV |
| 5 | L | H | L | L | 1.CV |
| 6 | L | H | L | H | 0·CV |
| 7 | L | H | H | L | 2·CV |
| 8 | L | H | H | H | 0·CV |
| 9 | H | L | L | L | 0·CV |
| 10 | H | L | L | H | 2·CV |
| 11 | H | L | H | L | 0·CV |
| 12 | H | L | H | H | 1.CV |
| 13 | H | H | L | L | 0·CV |
| 14 | H | H | L | H | 0·CV |
| 15 | H | H | H | L | 1·CV |
| 16 | H | H | H | H | 0·CV |

Fig. 13 (Prior Art)

| No. | D1 | | D2 | | consumed charge | | |
|---|---|---|---|---|---|---|---|
| | N | N+1 | N | N+1 | t1 | t2 | t1,t2 sum |
| 1 | L | L | L | L | 0·CV | 0·CV | 0·CV |
| 2 | L | L | L | H | 0·CV | 1·CV | 1·CV |
| 3 | L | L | H | L | 0·CV | 0·CV | 0·CV |
| 4 | L | L | H | H | 0·CV | 0·CV | 0·CV |
| 5 | L | H | L | L | 1·CV | 0·CV | 1·CV |
| 6 | L | H | L | H | 1·CV | 0·CV | 1·CV |
| 7 | L | H | H | L | 0·CV | 1·CV | 1·CV |
| 8 | L | H | H | H | 0·CV | 0·CV | 0·CV |
| 9 | H | L | L | L | 0·CV | 0·CV | 0·CV |
| 10 | H | L | L | H | 0·CV | 1·CV | 1·CV |
| 11 | H | L | H | L | 1·CV | 0·CV | 1·CV |
| 12 | H | L | H | H | 1·CV | 0·CV | 1·CV |
| 13 | H | H | L | L | 0·CV | 0·CV | 0·CV |
| 14 | H | H | L | H | 0·CV | 0·CV | 0·CV |
| 15 | H | H | H | L | 0·CV | 1·CV | 1·CV |
| 16 | H | H | H | H | 0·CV | 0·CV | 0·CV |

Fig. 20

| No. | D1 | | D2 | | D1,D2 of interval N | consumed charge | | |
|---|---|---|---|---|---|---|---|---|
| | N | N+1 | N | N+1 | | t1 | t2 | t1,t2 sum |
| 1 | L | L | L | L | same | 0·CV | – | 0·CV |
| 2 | L | L | L | H | same | 1·CV | – | 1·CV |
| 3 | L | L | H | L | different | 0·CV | 0·CV | 0·CV |
| 4 | L | L | H | H | different | 0·CV | 0·CV | 0·CV |
| 5 | L | H | L | L | same | 1·CV | – | 1·CV |
| 6 | L | H | L | H | same | 0·CV | – | 0·CV |
| 7 | L | H | H | L | different | 0·CV | 1·CV | 1·CV |
| 8 | L | H | H | H | different | 0·CV | 0·CV | 0·CV |
| 9 | H | L | L | L | different | 0·CV | 0·CV | 0·CV |
| 10 | H | L | L | H | different | 0·CV | 1·CV | 1·CV |
| 11 | H | L | H | L | same | 0·CV | – | 0·CV |
| 12 | H | L | H | H | same | 1·CV | – | 1·CV |
| 13 | H | H | L | L | different | 0·CV | 0·CV | 0·CV |
| 14 | H | H | L | H | different | 0·CV | 0·CV | 0·CV |
| 15 | H | H | H | L | same | 1·CV | – | 1·CV |
| 16 | H | H | H | H | same | 0·CV | – | 0·CV |

Fig. 25

| No. | D1 | | D2 | | D1,D2 of interval N | consumed charge | | |
|---|---|---|---|---|---|---|---|---|
| | N | N+1 | N | N+1 | | t1 | t2 | t1,t2 sum |
| 1 | L | L | L | L | same | 0·CV | 0·CV | 0·CV |
| 2 | L | L | L | H | same | 0·CV | 1·CV | 1·CV |
| 3 | L | L | H | L | different | 0·CV | 0·CV | 0·CV |
| 4 | L | L | H | H | different | 0·CV | 0·CV | 0·CV |
| 5 | L | H | L | L | same | 0·CV | 1·CV | 1·CV |
| 6 | L | H | L | H | same | 0·CV | 0·CV | 0·CV |
| 7 | L | H | H | L | different | 0·CV | 1·CV | 1·CV |
| 8 | L | H | H | H | different | 0·CV | 0·CV | 0·CV |
| 9 | H | L | L | L | different | 0·CV | 0·CV | 0·CV |
| 10 | H | L | L | H | different | 0·CV | 1·CV | 1·CV |
| 11 | H | L | H | L | same | 0·CV | 0·CV | 0·CV |
| 12 | H | L | H | H | same | 0·CV | 1·CV | 1·CV |
| 13 | H | H | L | L | different | 0·CV | 0·CV | 0·CV |
| 14 | H | H | L | H | different | 0·CV | 0·CV | 0·CV |
| 15 | H | H | H | L | same | 0·CV | 1·CV | 1·CV |
| 16 | H | H | H | H | same | 0·CV | 0·CV | 0·CV |

Fig. 26

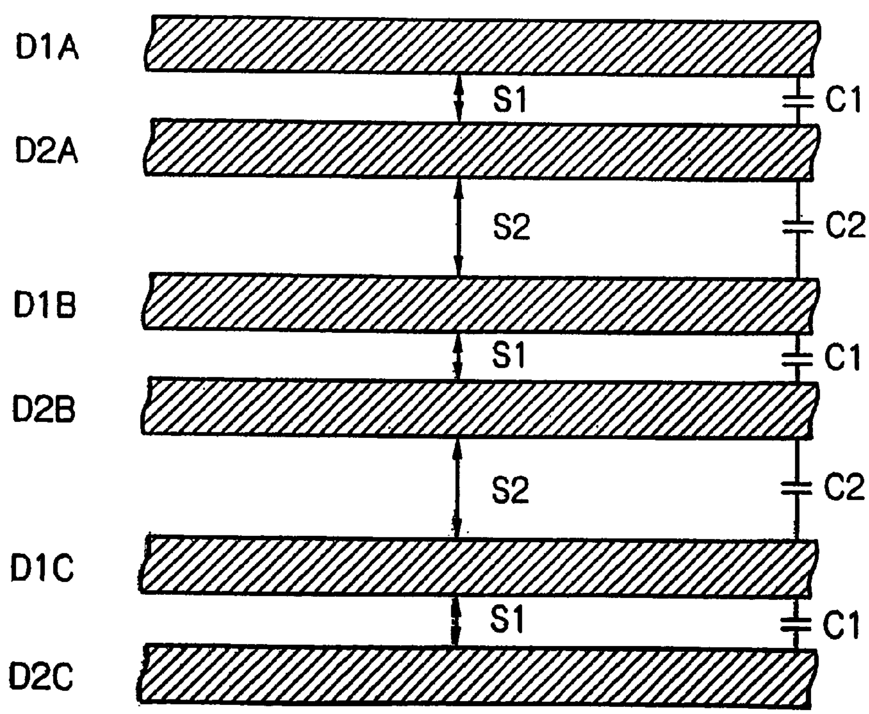

SIGNAL LINE DRIVER CIRCUIT WHICH REDUCES POWER CONSUMPTION AND ENABLES HIGH-SPEED DATA TRANSFER

BACKGROUND OF THE INVENTION

1. Field of the Invention

The present invention relates to signal line drive circuit in a semiconductor integrated circuit, and more particularly to a signal line drive circuit that can reduce the charge and discharge of current in signal lines.

2. Description of the Related Art

The trend in technology in the semiconductor field in recent years has been toward ever-increasing data transfer rates. For example, in semiconductor memory devices such as DRAM (Dynamic Random Access Memory), an increase in the data transfer rate between devices has been realized without raising the operating speed inside devices by providing a plurality of internal interfaces for the I/O bus and data bus and by using prefetch. These innovations are referred to as the DDR (Double Data Rate) technology, and memory in which this technology is used is referred to as DDR memory.

DDR includes DDRI, DDRII, and DDRIII, according to the number of bits by which prefetch is implemented. In DDRI, the number of prefetch bits is 2, in DDRII, the number of prefetch bits is 4, and in DDRIII, the number of prefetch bits is 8. The greater the number of prefetch bits, the greater the level of acceleration of the data transfer rate. In this way, an acceleration of the rate of data transfer between devices can be implemented while maintaining a substantially uniform operating speed inside the semiconductor memory device.

FIG. 1 shows the configuration of a semiconductor memory device of the prior art. Referring to FIG. 1, the semiconductor memory device of the prior art includes: input/output pad 141, input/output circuit 142, two data bus signal lines D1 and D2, read/write circuit 143, and memory arrays 144. Input/output pad 141 is for exchanging data with devices outside the chip. Input/output circuit 142 controls the input and output of data of the input/output pad.

Read/write circuit 143 includes: read circuit 145, write circuit 146, and I/O bus signal lines IO1 and IO2. Write circuit 146 is connected to data bus signal lines D1 and D2 and I/O bus signal lines IO1 and IO2. Read circuit 145 is connected to data bus signal lines D1 and D2 and I/O bus signal lines IO1 and IO2.

I/O bus signal lines IO1 and IO2 exchange data with memory arrays 144. Read circuit 145 reads data of I/O bus signal lines IO1 and IO2 to data bus signal lines D1 and D2. Write circuit 146 transfers data of data bus signal lines D1 and D2 to I/O bus signal lines IO1 and IO2.

Although only one read/write circuit 143 is shown in the figure, a plurality of read/write circuits is normally provided for the pair of signal lines composed of data bus signal lines D1 and D2. Any one of the plurality of read/write circuits is then selected in accordance with a given address, and the selected circuit then operates. Further, although only one input/output pad 141 is shown in the figure, a single semiconductor memory device is normally provided with a plurality of input/output pads 141.

FIG. 2 is timing charts showing the operation of the semiconductor memory device of the prior art that is shown in FIG. 1 FIG. 2, (A) is a timing chart for a read operation, and (B) is a timing chart for the write operation.

In the read operation, a read command together with an address (external address) is supplied to the semiconductor memory device. In FIG. 2(A), it is assumed that the read command is provided to read circuit 145 at the rise timing ck1 of an external clock signal.

Read circuit 145 selects two-bit memory cells in memory arrays 144 in accordance with the external address. Data DATA1 and DATA2 are simultaneously supplied as output from the memory cell to I/O bus signal lines IO1 and IO2, respectively.

Read circuit 145 next supplies data DATA1 and DATA2 of I/O bus signal lines IO1 and IO2 to data bus signal lines D1 and D2, respectively.

Input/output circuit 142 supplies data DATA1 of data bus signal line D1 to input/output pad 141 at time ck3 that is synchronized with the external clock signal. Input/output circuit 142 next supplies data DATA2 of data bus signal line D2 to input/output pad 141 at time ck3*d* that is delayed one-half cycle from the external clock signal.

The determination of which of data DATA1 and DATA2 that is supplied first to input/output pad 141 depends on, for example, the value of the least significant bit of the external address. In other words, if the least significant bit A0 of the address is "Low," data DATA1 is supplied at timing ck3 and data DATA2 is supplied at timing ck3*d*; and if the least significant bit A0 is "High," data DATA2 is supplied at timing ck3 and data DATA1 is supplied at timing ck3*d*. FIG. 2(A) shows an example in which the least significant bit A0 is "Low."

In the write operation, a write command is supplied together with an address (external address) and data to the semiconductor memory device. In FIG. 2(B), the write command is applied to write circuit 146 at timing ck1 of the rise of the external clock signal.

Input/output circuit 142 takes in data DATA1 of input/output pad 141 at the next rise timing ck2 of the external clock signal. In addition, input/output circuit 142 takes in data DATA2 of input/output pad 141 at timing ck2*d* that is further delayed a half-cycle.

Input/output circuit 142 supplies data DATA1 as output to data bus signal line D1 and supplies data DATA2 as output to data bus signal line D2 at timing t1. Write circuit 146 next simultaneously supplies data DATA1 of data bus signal line D1 to I/O bus signal line IO1 and data DATA2 of data bus signal line D2 to I/O bus signal line IO2 and writes these data items to two-bit memory cells at the prescribed addresses.

As in the read operation, the determination of which of data DATA1 and data DATA2 that are to be applied first to input/output pad 141 depends on, for example, the value of the least significant bit of the external address. In other words, when the least significant bit A0 of the address is "Low," data DATA1 are applied first, and when least significant bit A0 is "High," data DATA2 are applied first. In the following explanation, the least significant bit A0 of the external address is assumed to be "Low" unless otherwise stated.

As shown in FIGS. 2(A) and (B) above, in a DDRI semiconductor memory device of the prior art, read/write operations of two-bit memory cells in memory arrays 144 are carried out in parallel in one step, while the input/output of two bits of data at input/output pad 141 is carried out serially at different timings. The data transfer rate can thus be accelerated without accelerating the read/write operations of the memory cells.

Although DDRI that employs 2-bit prefetch has been described here, DDRII that employs 4-bit prefetch and DDRIII that employs 8-bit prefetch operate according to the same principles. In DDRII, four internal interfaces are required, and eight internal interfaces are required in DDRIII.

With the increases to higher speeds from DDRI to DDRII and from DDRII to DDRIII, the data bus width of the internal interfaces expands, the charge and discharge of current from the data-bus interconnections increases, and the electrical source noise when data are transferred to the data bus increases. On the other hand, with miniaturization of the semiconductor structure, the proportion of capacitance produced by coupling between adjacent signal lines that accounts for the wiring capacitance of signal lines such as data bus signal lines also increases. Coupling capacitance between adjacent signal lines therefore now accounts for the greater part of wiring capacitance.

Current research now focuses on reducing the current consumption that results from the charge and discharge of the coupling capacitance, and further, reducing the power source noise that is produced by charging and discharging, and in recent years, a variety of methods have been investigated for reducing the consumption of current that results from the charge and discharge of coupling capacitance.

A technique known as "data bus inversion" has been disclosed as a method for reducing the consumption of current caused by the charge and discharge of coupling capacitance (for example, refer to Japanese Patent No. 2647344). In the data bus inversion technique, a single determination output signal is conferred to a data bus that is composed of a plurality of signal lines. Next, for each signal line, data that are currently being supplied as output are compared with data that are to be supplied as output.

If the data of a majority of signal lines change, the logic of the next data of all signal lines is inverted and supplied as output. A determination output signal is activated together with this output. If the number of signal lines in which data change does not constitute a majority, the logic of the next data is supplied as non-inverted output. The determination output signal is then deactivated together with this output.

In this way, the number of signal lines in which levels change will always be less than a majority of the number of all signal lines of the data bus, and the consumed current and power source noise of data transfer are consequently reduced.

As another method for reducing the current consumption that results from charging and discharging of coupling capacitance, the transfer timing of each signal line of the data bus can be serially divided (for example, refer to Japanese Patent Laid-Open Publication No. 2002-025265).

FIG. 3 is a timing chart showing the operations of the semiconductor memory device of the prior art in which the transfer timing of each signal is serially divided. The configuration of the semiconductor memory device is assumed to be similar to the device shown in FIG. 1. In FIG. 3, (A) is a timing chart for a read operation, and (B) is a timing chart for a write operation.

In the read operation, a read command is supplied together with an address (external address) to the semiconductor memory device. In FIG. 3(A), the read command is supplied to read circuit 145 at timing ck1 of the rise of the external clock signal.

Read circuit 145 selects two-bit memory cells in memory arrays 144 in accordance with the external address. Data DATA1 and DATA2 from these memory cells are simultaneously supplied to I/O bus signal lines IO1 and IO2, respectively.

Read circuit 145 next supplies data DATA1 of I/O bus signal line IO1 as output to data bus signal line D1 at timing t1. Read circuit 145 then supplies data DATA2 of I/O bus signal line IO2 to data bus signal line D2 at timing t2.

Input/output circuit 142 next supplies data DATA1 of data bus signal line D1 as output to input/output pad 141 at timing ck3 that is synchronized with the external clock signal. Input/output circuit 142 then supplies data DATA2 of data bus signal line D2 to input/output pad 141 at timing ck3*d* that is delayed one half-cycle from the external clock.

In this read operation, data DATA1 is supplied first to input/output pad 141 and data DATA2 is supplied after, and the transfer of data DATA1 therefore requires high speed, while the need for high speed in the transfer of data DATA2 is low. When data DATA1 change, data DATA2 do not change, whereby the power source noise at such times is lower than a case of simultaneous change and the transfer of data DATA1 can therefore be accelerated.

In a write operation, a write command is supplied to the semiconductor memory device together with an address (external address) and data. In FIG. 3(B), write command is supplied to write circuit 146 at timing ck1 of the rise of the external clock signal.

Input/output circuit 142 takes in data DATA1 of input/output pad 141 at the rise timing ck2 of the next external clock signal. Input/output circuit 142 further takes in data DATA2 of input/output pad 141 at timing ck2*d* that is delayed a half-cycle.

Input/output circuit 142 next supplies data DATA1 as output to data bus signal line D1 at timing t1. Input/output circuit 142 next supplies data DATA2 as output to data bus signal line D2. Write circuit 146 next supplies data DATA1 of data bus signal line D1 as output to I/O bus signal line IO1, simultaneously supplies data DATA2 of data bus signal line D2 as output to I/O bus signal line IO2, and writes these data to two-bit memory cells of prescribed addresses.

In these write operations, data DATA1 is applied first to input/output pad 141 followed by data DATA2, and the transfer of data DATA1 therefore does not demand high speed, while the transfer of data DATA2 does demand high speed. When data DATA2 change, data DATA1 do not change, and the power source noise at this time is therefore less than for a case of simultaneous change. The transfer of data DATA2 can therefore be realized at higher speed.

Timing t1 of FIG. 3(B) is a timing that precedes timing t1 of FIG. 2(B), and timing t2 of FIG. 3(B) is the same timing as timing t1 of FIG. 2(B).

FIG. 4 shows a typical example of the configuration of the read circuit that is shown in FIG. 1. Referring to FIG. 4, read circuit 145 includes: signal line drive circuits 171 and 172, control circuits 173 and 174, and timing generation circuit 175.

In addition, internal clock signal ICLK, activation signal ACT, and address signal A0 are applied as input to read circuit 145. Internal clock signal ICLK is a clock that is generated based on the external clock. Activation signal ACT is a signal for activating read circuit 145 in accordance with a read command and an external address. Address signal A0 is an address signal of the least significant digit of an external address.

FIG. 4 shows one read circuit 145, and I/O bus signal line and data bus signal line each show one of the plurality of signal lines that make up each bus.

Timing generation circuit 175 supplies an operation timing signal to each of control circuits 173 and 174.

Control circuit 173 is connected to I/O bus signal line IO1 and controls the output from signal line drive circuit 171 to data bus signal line D1 in accordance with the timing signals from timing generation circuit 175. Control circuit 174 is connected to I/O bus signal line IO2 and controls the output from signal line drive circuit 172 to data bus signal line D2 in accordance with the timing signals from timing generation circuit 175.

Signal line drive circuit 171 is a configuration in which n-channel transistor QN1 and p-channel transistor QP1 are connected in a series. Signal line drive circuit 171 drives the signal of data bus signal line D1 with the two transistors QN1 and QP1 under the control of control circuit 173.

Signal line drive circuit 172 is a configuration in which n-channel transistor QN2 and p-channel transistor QP2 are connected in a series. Signal line drive circuit 172 drives the signal of data bus signal line D2 with the two transistors QN2 and QP2 under the control of control circuit 174.

Coupling capacitance C exists between data bus signal line D1 and data bus signal line D2, and in addition, wiring capacitance c1 and c2 exist in each of data bus signal lines D1 and D2.

With the miniaturization of semiconductors, the coupling capacitance of adjacent signal lines tends to increase in signal lines such as buses, and coupling capacitance has therefore become dominant in the wiring capacitance of signal lines in recent years. In data bus signal lines D1 and D2 in FIG. 4, coupling capacitance C accounts for the largest proportion of the wiring capacitance.

While the value of coupling capacitance C between signal lines is normally on the order of several pico ($10^{-12}$) Farads, the capacitance of the internal interconnections of read circuit 145 and such parts as the gates and diffusion layers of each transistor is on the order of several femto ($10^{-15}$) Farads. As a result, the total sum of all the capacitance inside read circuit 145 amounts to no more than the order of several hundred femto Farads. The charge and discharge of current of the coupling capacitance accounts for a major portion of the consumed current that is consumed by passage through read circuit 145.

Reference voltage Vss is supplied via Vss pad 176 to read circuit 145. In the supply of reference voltage Vss, the wiring resistance is r1. In addition, a positive power supply voltage Vdd is supplied via Vdd pad 177 to read circuit 145. In the supply of power supply voltage Vdd, the wiring resistance is r2.

At the instant that signal line drive circuits 171 and 172 drive data bus signal lines D1 and D2, a peak current flows through resistance r1 and r2. As a result, the voltage of Vdd interconnections in read circuit 145 falls below power supply voltage Vdd due to the voltage drop at resistance r2. In addition, the voltage of Vss interconnections in read circuit 145 rises above reference voltage Vss. This fluctuation in the power supply voltage and reference voltage causes power source noise.

When power source noise occurs, the difference in voltage between the effective reference voltage Vss and power supply voltage Vdd inside read circuit 145 decreases, and the operating speed of read circuit 145 is reduced. If this peak current can be reduced, the operation of read circuit 145 can be accelerated.

Comparing the operations in FIG. 3(A) and FIG. 2(A), data bus signal lines D1 and D2 in FIG. 3(A) supply output at different timings and the peak current that is consumed in read circuit 145 is therefore reduced, and this operation is therefore able to proceed at a higher speed than the operation in FIG. 2(A).

FIG. 5 shows details of the configuration of the timing generation circuit that is shown in FIG. 4. Referring to FIG. 5, timing generation circuit 175 includes delay circuits DELAY1 and DELAY2 and timing switch circuit 181.

Delay circuits DELAY1 and DELAY2 each provide internal clock signals ICLK that have each been delayed by respective prescribed delay times to timing switch circuit 181. Timing switch circuit 181 generates timing signals based on address signal A0 of the least significant digit of the external address and clocks that have been delayed at delay circuits DELAY1 and DELAY2 and supplies these timing signals to control circuits 173 and 174.

For example, for read circuit 145 to operate at the timings that are shown in FIG. 3(A), delay circuit DELAY1 is set to a delay time such that timing t1 is obtained from internal clock signal ICLK. Further, delay circuit DELAY2 is set to a delay time such that timing t2 is obtained from internal clock signal ICLK.

When address signal A0 is “Low,” timing switch circuit 181 supplies clocks from delay circuit DELAY1 to control circuit 173 and supplies clocks from delay circuit DELAY2 to control circuit 174. When address signal A0 is “High,” timing switch circuit 181 supplies clocks from delay circuit DELAY2 to control circuit 173 and supplies clocks from delay circuit DELAY1 to control circuit 174.

Further, for read circuit 145 to operate at, for example, the timing that is shown in FIG. 2(A), delay circuits DELAY1 and DELAY2 should both be set to a delay time such that timing t1 is obtained from internal clock signal ICLK. Alternatively, a single delay circuit may be provided.

FIG. 6 shows in detail the configuration of the control circuits that are shown in FIG. 4. Control circuit 173 and control circuit 174 have the same configuration, and an example of control circuit 174 is shown in FIG. 6.

Referring to FIG. 6, control circuit 174 includes: amplifier 191, transfer gates TG1 and TG2, inverters INV1-INV5, NAND circuit NAND1, and NOR circuit NOR1.

Amplifier 191 is activated by activation signal ACT, amplifies the signal of I/O bus signal line IO2, and supplies the amplified signal to transfer gate TG1. Transfer gate TG1 turns ON when internal clock signal ICLK is activated. The circuit that is composed of inverters INV1 and INV2 holds the values of node N1 that is connected to the output of transfer gate TG1. The output of transfer gate TG1 is supplied to transfer gate TG2. Transfer gate TG2 turns ON when the timing signal from timing generation circuit 175 is activated. The circuit that is composed of inverter INV3 and INV4 holds the value of node N2 that is connected to the output of transfer gate TG2.

NAND circuit NAND1 finds the NAND logic of the value of node N2 and the value of activation signal ACT and supplies this logic to the gate of transistor QP2. NOR circuit NOR1 finds the NOR logic of the value of node N2 and the value of the signal in which activation signal ACT is inverted by inverter INV5 and supplies this logic to the gate of transistor QN2.

Regarding the operation of control circuit 174, amplifier 191 is first activated when activation signal ACT is activated. During reading, a microvoltage is supplied as output from memory array to I/O bus signal line IO2, and this voltage is amplified to logic level by amplifier 191. In addition, when activation signal ACT is activated, either transistor QN2 or transistor QP2 turns ON in accordance with the value of node N2, and data bus signal line D2 is thus driven.

When internal clock signal ICLK is activated, transfer gate TG1 turns ON and the output of amplifier 191 is transferred to node N1. Next, transfer gate TG2 turns ON in accordance with the timing signal from timing generation circuit 175, and the value of node N1 is transferred to node N2. The output of transfer gate TG2 passes via NAND circuit NAND1 and NOR circuit NOR1 and is supplied to the gates of transistor QN2 and transistor QP2.

Although the details of read circuit 145 have been explained to this point, write circuit 146 can also be realized by a circuit similar to that shown in FIGS. 4–6.

FIG. 7 shows a circuit that is a simplification of the read circuit that is shown in FIG. 4. Referring to FIG. 7, the simplified circuit is composed of signal line drive circuit 201 and drives both of data bus signal lines D1 and D2. In this case, as with FIG. 4, the data bus signal line indicates a single signal line in a data bus.

Signal line drive circuit 201 includes n-channel transistors QN1 and QN2 and p-channel transistors QP1 and QP2.

Transistor QP1 and transistor QN1 are connected in a series between Vss pad 202 to which reference voltage Vss is applied and Vdd pad 203 to which positive power supply voltage Vdd is applied. Similarly, transistor QP2 and transistor QN2 are connected in a series between Vss pad 202 to which reference voltage Vss is applied and Vdd pad 203 to which positive power supply voltage Vdd is applied.

Data bus signal line D1 is driven by the node of transistor QP1 and transistor QN1. Data bus signal line D2 is driven by the node of transistor QP2 and transistor QN2. Coupling capacitance C of the adjacent signal lines is present between data bus signal line D1 and data bus signal line D2. In FIG. 7, the other wiring capacitance that was shown in FIG. 4 has been omitted.

The current that is consumed by the charge and discharge of the coupling capacitance C during read operations and write operations is next considered using the circuit of FIG. 7.

FIG. 8 is a timing chart showing the relation between data bus signal lines D1 and D2 in the operations that are shown in FIGS. 2(A) and (B). Referring to FIG. 8, the data of data bus signal lines D1 and D2 are simultaneously switched at timing t1. The interval preceding timing t1 is here referred to as N, and the interval following timing t1 is referred to as N+1.

The logic of data of data bus signal line D1 in interval N, the logic of data of data bus signal line D2 of interval N, the logic of data of data bus signal line D1 of interval N+1, and the logic of data of data bus signal line D2 of interval N+1 can be either "High" or "Low." Accordingly, combinations of this logic can take 16 different forms.

FIG. 9 is a table showing the charge that is consumed by the charge and discharge of coupling capacitance C for each of the sixteen combinations of logic in FIG. 8. In the table of FIG. 9, a combination number (No.) is conferred to each of the combinations. In addition, in the table, "L" indicates "Low" level, i.e., reference voltage Vss; and "H" indicates "High" level i.e., power supply voltage Vdd. "V" is the difference in potential between power supply voltage Vdd and reference voltage Vss, and "C" is the value of the coupling capacitance.

The charge consumption of each of sixteen combinations can be classified into the following five patterns.

(Pattern 1)

Pattern 1 is represented by combination No. 1, in which there is no change in data on either of data bus signal lines D1 and D2 between interval N and interval N+1, whereby no charge or discharge of coupling capacitance C occurs, and the consumed charge is 0.

(Pattern 2)

Pattern 2 is represented by combination No. 6. In combination No. 6, data bus signal line D1 changes from L in interval N to H in interval N+1. Similarly, data bus signal line D2 also changes from L in interval N to H in interval N+1. In this case as well, there is no charge or discharge of coupling capacitance C and the consumed charge is therefore 0.

(Pattern 3)

Pattern 3 is represented by combination No. 10. In combination No. 10, data bus signal line D1 changes from "H" in interval N to "L" in interval N+1. In contrast, data bus signal line D2 changes from "L" in interval N to "H" in interval N+1.

FIG. 10 shows the flow of charge in pattern 3. Referring to FIG. 10, charge flows from Vdd pad 203, through transistor QP2, and to data bus signal line D2. Charge further flows through coupling capacitance C to data bus signal line D1. Still further, charge flows through transistor QN1 to Vss pad 202.

By this operation, the difference in potential between data bus signal line D1 and data bus signal line D2 changes from V to −V. In other words, a change in voltage of 2V occurs in the difference in potential, and the charge that flows between Vdd pad 203 and Vss pad 202, i.e., the charge that is consumed by coupling capacitance C, is 2·CV.

(Pattern 4)

Pattern 4 is represented by combination No. 2. In combination No. 2, there is no change in data between interval N and interval N+1 in data bus signal line D1, but a change occurs from "L" in interval N to "H" in interval N+1 in data bus signal line D2.

At this time, the difference in potential between data bus signal line D1 and data bus signal line D2 changes by way of coupling capacitance C from 0 to V. In other words, a change in voltage of V occurs in the difference in potential, and the charge that flows between Vdd pad 203 and Vss pad 202 is 1·CV.

(Pattern 5)

Pattern 5 is represented by combination No. 9. In combination No. 9, a change from "H" in interval N to "L" in interval N+1 occurs in data bus signal line D1, but no change occurs in the data between interval N and interval N+1 in data bus signal line D2.

FIG. 11 shows the flow of charge in pattern 5. Referring to FIG. 11, data bus signal line D1 is "H" and data bus signal line D2 is "L" in interval N. As a result, the difference in potential across the two ends of coupling capacitance C is V, and in this state, a charge of 1·CV is stored in coupling capacitance C. At timing t1, data bus signal line D1 changes from "H" to "L," whereupon the charge that is stored in coupling capacitance C passes from data bus signal line D1 through transistor QN1. The charge stored in coupling capacitance C is consequently discharged and becomes 0. In addition, the charge that has passed through transistor QN1 passes through transistor QN2 and flows into data bus signal line D2.

By these operations, charge does not flow to Vdd pad 203 and Vss pad 202, and the consumed charge is therefore 0. Further, no charge flows to the wiring resistance of Vdd and Vss, and power source noise is therefore not generated.

FIG. 9 shows the sixteen combinations classified among patterns 1–5 along with the consumed charge. If it is assumed that data are generated randomly in data bus signal lines D1 and D2, the average charge that is consumed by the charge and discharge of coupling capacitance C in a single operation is $(8/16)\cdot CV = 0.5$ CV.

FIG. 12 is a timing chart showing the relations between data bus signal lines D1 and D2 in the operations that are shown in FIGS. 3(A) and (B). Referring to FIG. 12, the data of data bus signal line D1 switch at timing t1, and the data of data bus signal line D2 switch at timing t2. In this case, the interval preceding timing t1 is N and the interval following timing t2 is N+1.

In this case as well, the logic for intervals N and N+1 and data bus signal lines D1 and D2 can be combined in sixteen ways.

FIG. 13 is a table showing the charge that is consumed by the charge and discharge of coupling capacitance C for each of the sixteen combinations of logic in FIG. 12. Comparing the charge consumption in the table of FIG. 13 and the table of FIG. 9, there are differences in values for combination Nos. 6, 7, 10, and 11.

In combination No. 6 in FIG. 13, a change from "L" in interval N to "H" in interval N+1 occurs in both data bus signal lines D1 and D2. However, only data bus signal line D1 changes at timing t1, and a charge of 1·CV is consumed in the charging of coupling capacitance C. Coupling capacitance C is discharged at timing t2 and the consumed charge is therefore 0. As a result, the consumed charge from interval N to interval N+1 is 1·CV. Similarly, the consumed charge in combination No. 11 is 1·CV.

In combination No. 10 in FIG. 13, data bus signal line D1 changes from "H" in interval N to "L" in interval N+1, and data bus signal line D2 changes from "L" in interval N to "H" in interval N+1. In this case, a discharge of coupling capacitance C occurs at timing t1 and the consumed charge is therefore 0. At timing t2, the coupling capacitance C is charged and the consumed charge is therefore 1·CV. As a result, the consumed charge from interval N to interval N+1 is 1·CV. Similarly, the consumed charge of combination No. 7 is also 1·CV.

If it is assumed that data are generated randomly in data bus signal lines D1 and D2 in the operations of FIG. 13, the average charge that is consumed by charge and discharge of coupling capacitance C in a single operation is $(8/16)\cdot CV=0.5$ CV.

To facilitate understanding, the explanation focused on the consumption of charge rather than the consumption of current, but the current consumption can be found by dividing this charge consumption by the period of the cycle at which data are switched.

The above-described prior art has the following disadvantages: In the data bus inversion technique, a semiconductor memory device: finds for each of the plurality of signal lines of a data bus whether or not a change has occurred between the data of interval N and the data of interval N+1 as in, for example, the timing chart of FIG. 8; finds whether the number of signal lines in which a change of data has occurred is greater than or less than a majority; and then supplies the data of interval N+1 as output. There is consequently the problem that the output of data is delayed by the time for this calculation.

Further, the operations that are shown in FIG. 3 can be accelerated compared to the operations that are shown in FIG. 2, but the effect of reducing the current consumption that results from the charge and discharge of coupling capacitance cannot be obtained. As explained in Japanese Patent Laid-Open Publication No. 2002-025265, reducing the current consumption caused by these operations has the effect of enabling a simplification of the amplifiers and output circuits for data that are transferred slowly, and consequently, enabling lower power. However, the current that is consumed by elements such as amplifiers or output circuits is minor when compared to the current that is consumed by coupling capacitance, and the effect of lower power is therefore not particularly great.

Finally, according to FIG. 13, the maximum peak current that flows in combination Nos. 7 and 10 in FIG. 9 is reduced by half, whereby a reduction in power source noise and an acceleration of data transfer can be realized. However, the problem still remains that power source noise occurs to a certain extent at timing t1, thereby causing a delay of data transfer.

SUMMARY OF THE INVENTION

It is an object of the present invention to reduce the current consumption in a circuit device, and further, to enable high-speed data transfer.

To achieve the above-described objects, the signal line drive circuit of the present invention supplies signals to a first signal line and a second signal line that form a pair and that are arranged adjacent to each other, and the signal line drive circuit includes a determination circuit, a control circuit, and a drive circuit.

The determination circuit determines whether the present signals of the first signal line and second signal line are the same or not.

The control circuit, according to whether the present signals of the first signal line and the second signal line are the same or not, selects a drive procedure that results in less charge and discharge of current in the coupling capacitance between the first signal line and the second signal line. The drive circuit drives the first signal line and second signal line in accordance with the drive procedure that was selected by the control circuit and supplies the signals as output.

The above and other objects, features, and advantages of the present invention will become apparent from the following description with reference to the accompanying drawings, which illustrate examples of the present invention.

BRIEF DESCRIPTION OF THE DRAWINGS

FIG. 3 is a timing chart showing the operations of the semiconductor memory device of the prior art in which the transfer timing of each signal is serially divided;

FIG. 13 is a table showing the charge that is consumed by the charge and discharge of coupling capacitance C for each of the sixteen combinations of logic in FIG. 12;

FIG. 20 is a table showing the charge that is consumed by the charge and discharge of coupling capacitance C for each of the sixteen combinations of logic in FIG. 19;

FIG. 25 is a table showing the charge that is consumed by charge and discharge of the coupling capacitance C for each of the sixteen combinations of logic in FIG. 24; and FIG. 26 shows an example of the interconnection layout having a plurality of data bus interconnection pairs.

DETAILED DESCRIPTION OF THE PREFERRED EMBODIMENTS

Explanation next regards embodiments of the present invention with reference to the accompanying figures.

Figure 14:
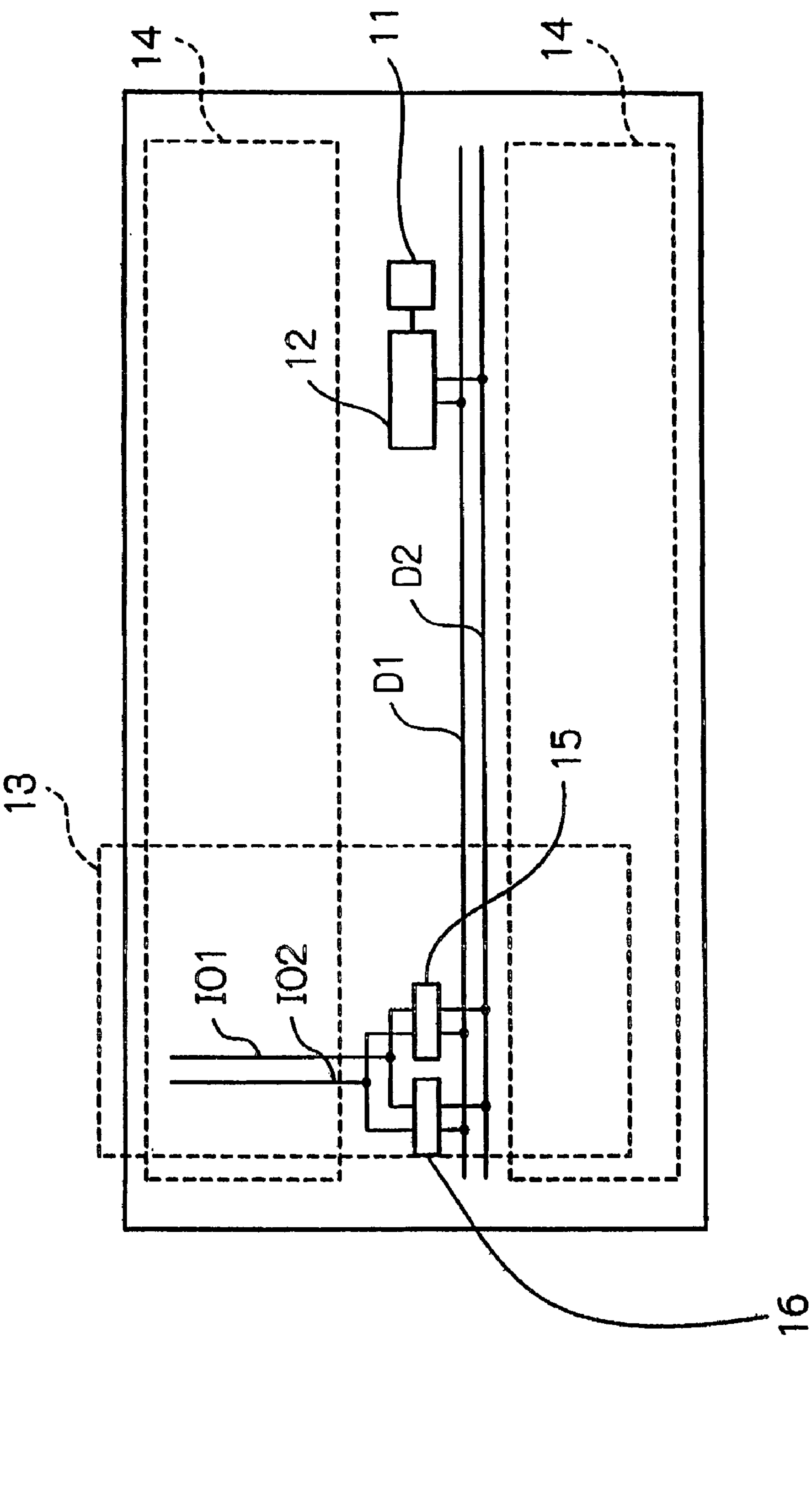
FIG. 14 shows the configuration of the semiconductor memory device of the first embodiment of the present invention.

FIG. 14 shows the semiconductor memory device of the first embodiment of the present invention.

Referring to FIG. 14, the semiconductor memory circuit of the present embodiment includes: input/output pad 11, input/output circuit 12, two data bus signal lines D1 and D2, read/write circuit 13, and memory arrays 14. Input/output pad 11 exchanges data with components that are outside the chip. Input/output circuit 12 controls the input/output of data of the input/output pad 11.

Read/write circuit 13 includes: read circuit 15, write circuit 16, and I/O bus signal lines IO1 and IO2. Write circuit 16 is connected to data bus signal lines D1 and D2 and I/O bus signal lines IO1 and IO2. In addition, read circuit 15 is also connected to data bus signal lines D1 and D2 and to I/O bus signal lines IO1 and IO2.

I/O bus signal lines IO1 and IO2 exchange data with memory arrays 14. Read circuit 15 reads the data of I/O bus signal lines IO1 and IO2 to data bus signal lines D1 and D2. Write circuit 16 transfers the data of data bus signal lines D1 and D2 to I/O bus signal lines IO1 and IO2.

Although only one read/write circuit 13 is shown in the figure, a plurality of read/write circuits are normally provided for a signal line pair that is composed of data bus signal lines D1 and D2. Any one among the plurality of read/write circuits is then selected according to the supplied address, and the selected circuit then operates. Further, although only one input/output pad 11 is shown in the figure, a plurality of input/output pads 11 are normally provided in one semiconductor memory device.

Figure 15:
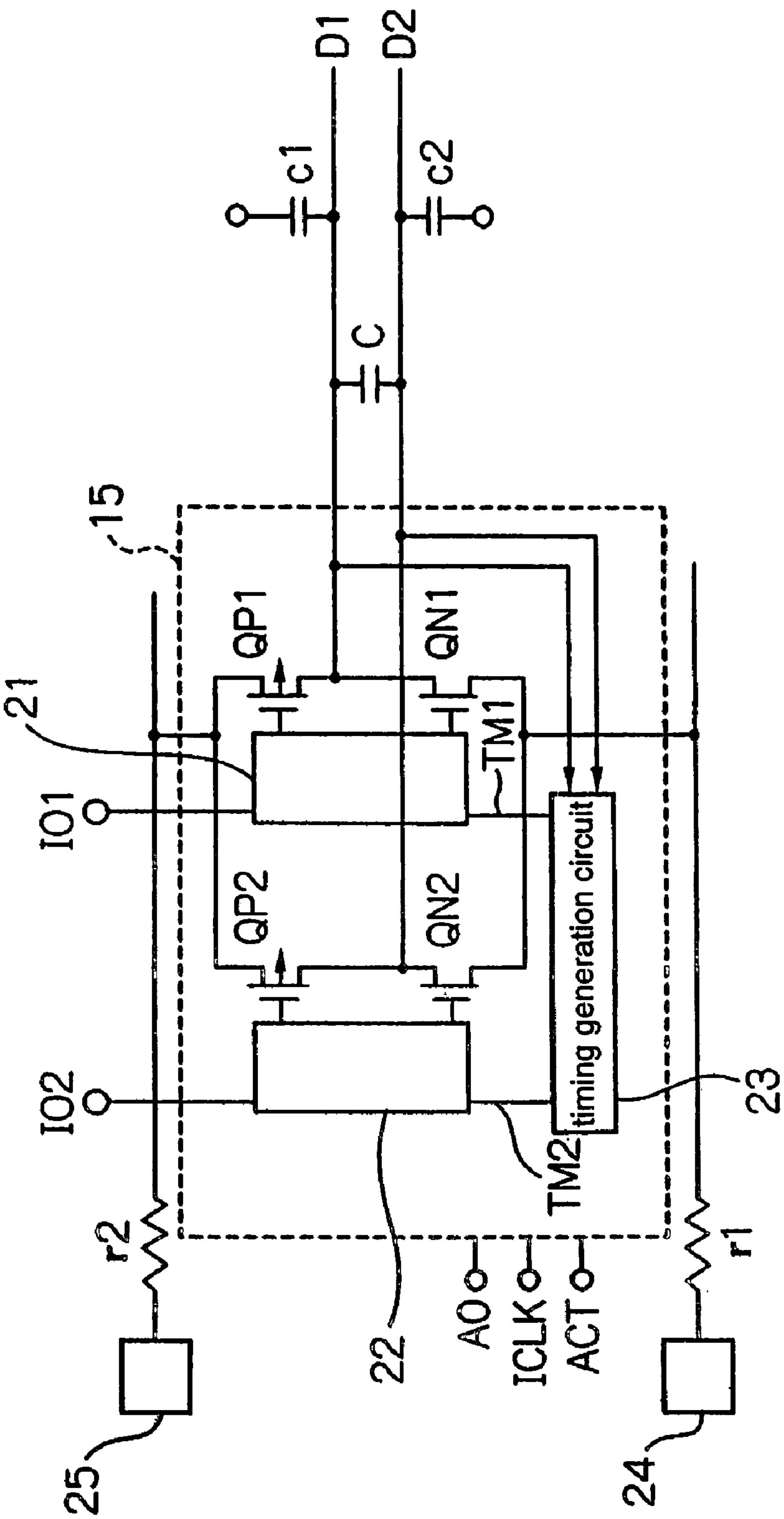
FIG. 15 shows an example of the read circuit that is shown in FIG. 14.
Figure 16:
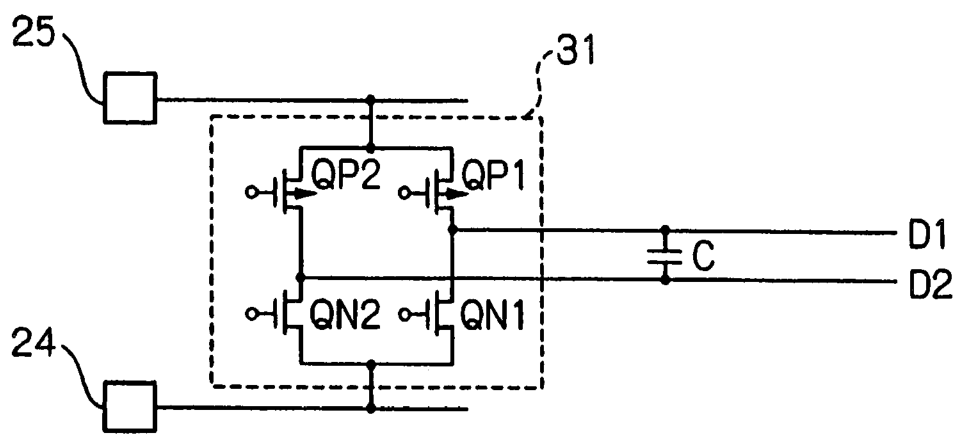
FIG. 16 shows the signal line drive circuit that is contained in the read circuit of FIG. 15.

FIG. 15 shows an example of the read circuit that is shown in FIG. 14. FIG. 16 shows the signal line drive circuit that is included in the read circuit of FIG. 15. Referring to FIG. 16, signal line drive circuit 31 is made up by transistors QP1, QP2, QN1, and QN2 that are shown in FIG. 15. Referring to FIG. 15 and FIG. 16, read circuit 15 includes signal line drive circuit 31, control circuits 21 and 22, and timing generation circuit 23.

In addition, internal clock signal ICLK, activation signal ACT, and address signal A0 are applied as input to read circuit 15. Internal clock signal ICLK is a clock that is generated based on an external clock. Activation signal ACT is a signal for activating read circuit 15 in accordance with a read command and an external address. Address signal A0 is the address signal of the least significant digit of an external address.

In FIG. 15, one read circuit 15 is shown, and for I/O bus signal lines and data bus signal lines, one signal line of the plurality of signal lines that make up each bus is shown.

Timing generation circuit 23 supplies operation timing signals to each of control circuits 21 and 22 in accordance with the data of data bus signal lines D1 and D2. Timing generation circuit 23 includes a determination circuit (not shown) for determining whether the data of data bus signal line D1 and data bus signal line D2 are the same or not, and supplies a timing signal in accordance with the result of determination to control circuits 21 and 22.

Control circuit 21 is connected to I/O bus signal line IO1 and controls the output from signal line drive circuit 31 to data bus signal line D1 in accordance with timing signals from timing generation circuit 23. Control circuit 22 is connected to I/O bus signal line IO2 and controls the output from signal line drive circuit 31 to data bus signal line D2 in accordance with timing signals from timing generation circuit 23.

Transistors QN1 and QN2 are n-channel transistors, and transistors QP1 and QP2 are p-channel transistors.

Signal line drive circuit 31 includes a circuit in which n-channel transistor QN1 and p-channel transistor QP1 that are controlled by control circuit 21 are serially connected, and a circuit in which n-channel transistor QN2 and p-channel transistor QP2 that are controlled by control circuit 22 are serially connected. The circuit in which transistor QN1 and transistor QP1 are serially connected and the circuit in which transistor QN2 and transistor QP2 are serially connected are both connected between the wiring of reference voltage Vss and the wiring of positive power supply voltage Vdd. In addition, the circuit in which transistor QN1 and transistor QP1 are serially connected drives data bus signal line D1. The circuit in which transistor QN2 and transistor QP2 are serially connected drives data bus signal line D2.

Data bus signal line D1 and data bus signal line D2 are arranged adjacent to each other, and coupling capacitance C therefore exists between these signal lines. In addition, other wiring capacitance c1 and c2 also exists in each of data bus signal lines D1 and D2.

With the miniaturization of semiconductors, the coupling capacitance between adjacent signal lines in the signal lines of, for example, a bus tends to increase, and as a result, the coupling capacitance has become dominant in the wiring capacitance of signal lines in recent years. In the data bus signal lines D1 and D2 in FIG. 15, coupling capacitance C accounts for the greatest proportion of the wiring capacitance. Consequently, of the current consumption that is consumed by passage through read circuit 15, the current of charging and discharging coupling capacitance C accounts for the greatest proportion.

Reference voltage Vss is supplied to read circuit 15 by way of Vss pad 24. In the supply of reference voltage Vss, the wiring resistance is taken to be r1. In addition, power supply voltage Vdd is supplied to read circuit 15 by way of Vdd pad 25. In the supply of power supply voltage Vdd, the wiring resistance is taken to be r2.

Figure 17:
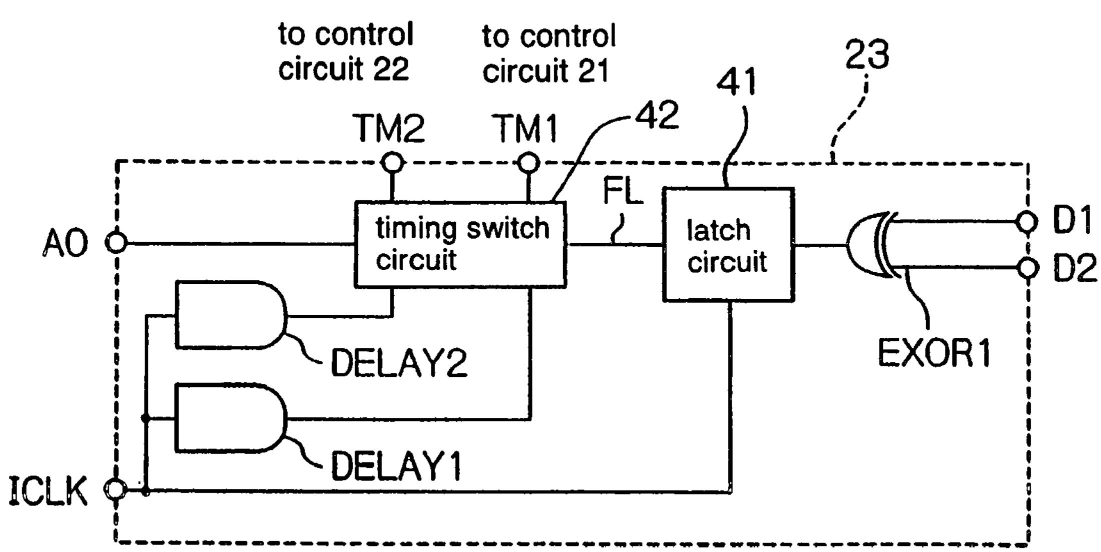
FIG. 17 shows the configuration of the timing generation circuit that is shown in FIG. 15.

FIG. 17 shows the details of the timing generation circuit that is shown in FIG. 15. Referring to FIG. 17, timing generation circuit 23 includes: delay circuits DELAY1 and DELAY2, EXCLUSIVE-OR circuit EXOR1, latch circuit 41, and timing switch circuit 42.

Delay circuit DELAY1 delays internal clock signal ICLK by a prescribed delay time to produce timing t1 and supplies timing t1 to timing switch circuit 42. Delay circuit DELAY2 delays internal clock signal ICLK by a prescribed delay time to produce timing t2 that is delayed from timing t1 and supplies timing t2 to timing switch circuit 42.

EXCLUSIVE-OR circuit EXOR1 finds the EXCLUSIVE-OR of the data of data bus signal line D1 and data bus signal line D2 and supplies this value to latch circuit 41. The calculation of whether the data of data bus signal line D1 and data bus signal line D2 are the same or different is based on this EXCLUSIVE-OR. Latch circuit 41 latches the output of EXOR1 in synchronization with internal clock signal ICLK and supplies the latched signal FL to timing switch circuit 42. In other words, the circuit for determining whether the data of data bus signal line D1 and data bus signal line D2 are the same or not is composed of EXCLUSIVE-OR circuit EXOR1 and latch circuit 41.

Timing switch circuit 42 supplies a timing signal that has been generated based on timings t1 and t2, address signal A0, and signal FL to control circuits 21 and 22.

It will here be assumed that address signal A0 is "Low." If signal FL from latch circuit 41 indicates that the data of data bus signal line D1 and data bus signal line D2 are the same in interval N, timing switch circuit 42 supplies timing signals of the same timing t1 to control circuits 21 and 22. If signal FL from latch circuit 41 indicates that the data of data bus signal line D1 and data bus signal line D2 are different in interval N, timing switch circuit 42 supplies a timing signal of timing t1 to control circuit 21 and supplies a timing signal of timing t2 to control circuit 22.

Figure 18:
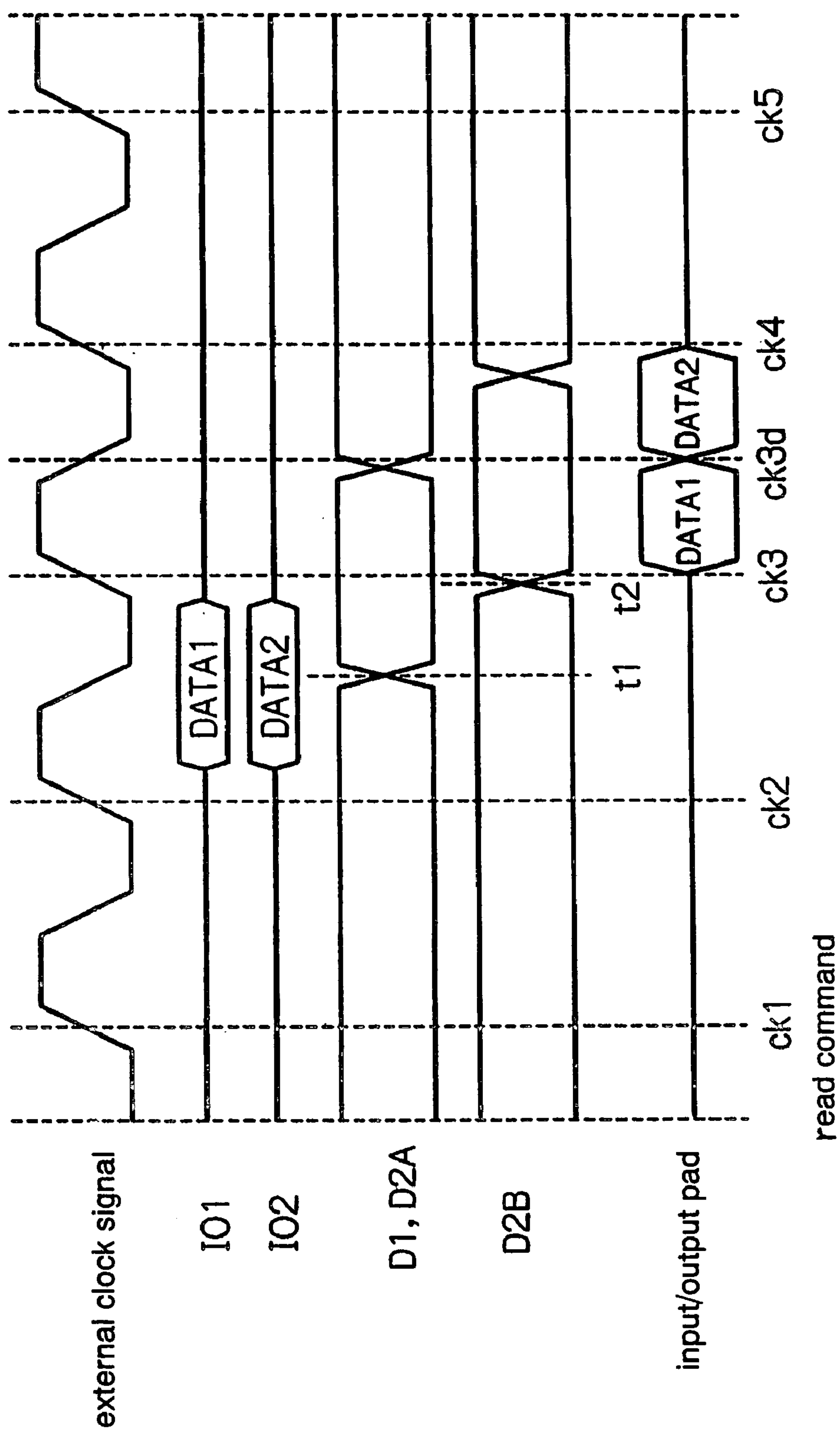
FIG. 18 is a timing chart showing the read operations of the semiconductor memory device of the present embodiment.

FIG. 18 is a timing chart showing the read operations of the semiconductor memory device of the present embodiment. In the read operations, an address (external address) is supplied together with a read command to the semiconductor memory device. In FIG. 18, it is assumed that the read command is supplied to read circuit 15 at the rise timing ck1 of the external clock signal.

Read circuit 15 selects two-bit memory cells in memory arrays 14 in accordance with the external address. Data DATA1 and DATA2 are simultaneously supplied as output from these memory cells to I/O bus signal lines IO1 and IO2, respectively.

Read circuit 15 next supplies data DATA1 of I/O bus signal line IO1 to data bus signal line D1 at timing t1.

Regarding data DATA2 of I/O bus signal line IO2, on the other hand, read circuit 15 supplies these data to data bus signal line D2 at either timing t1 or timing t2. The timing at which data DATA2 are supplied to data bus signal line D2 is selected by timing switch circuit 42 and instructed to control circuit 22 by a timing signal.

Figure 19:
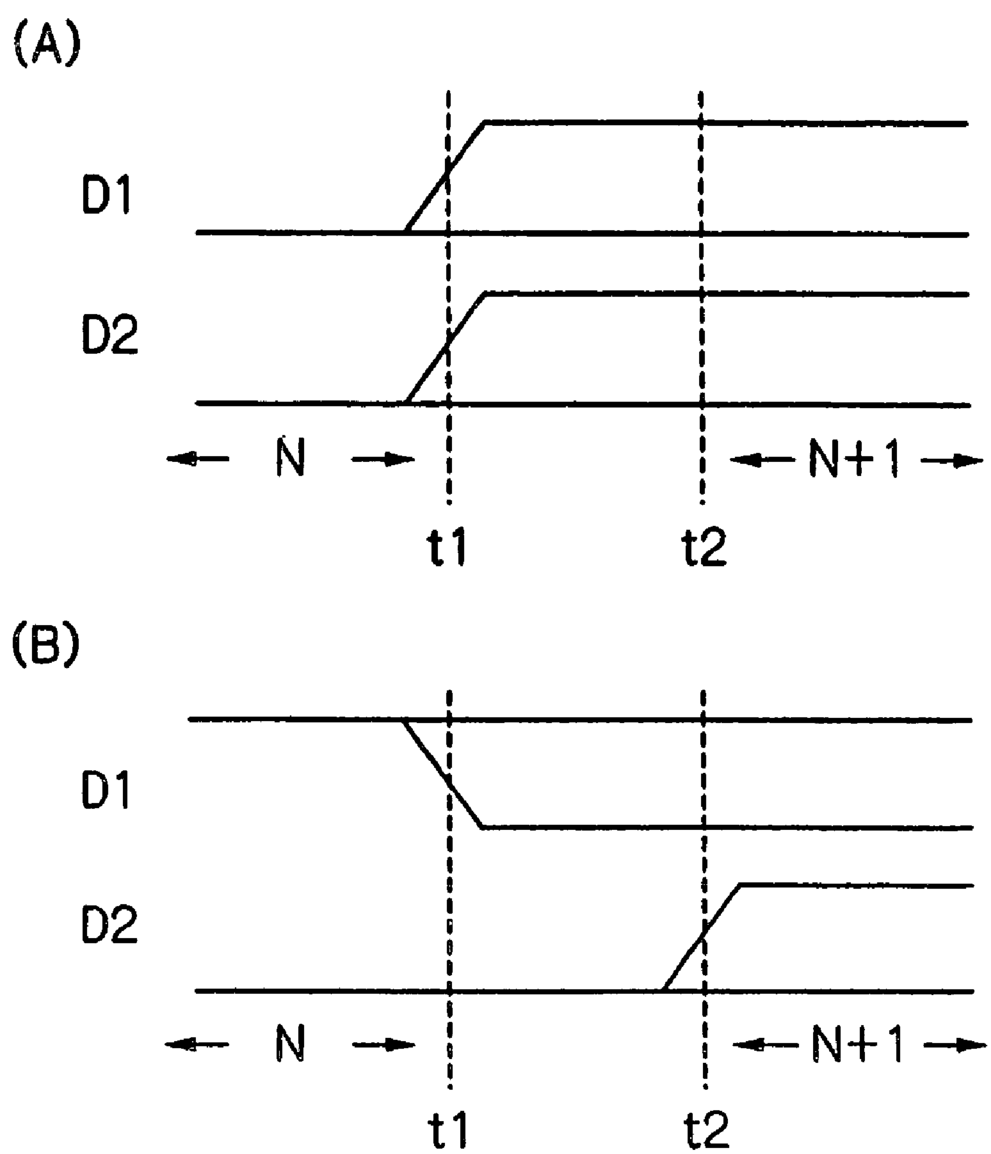
FIG. 19 is a timing chart showing the relations between data bus signal lines D1 and D2 in the operations that are shown in FIG. 18.

FIG. 19 is a timing chart that shows the relations between data bus signal lines D1 and D2 in the operations that are shown in FIG. 18. In this case, the interval that precedes timing t1 is N, and the interval that follows timing t2 is N+1. Referring to FIG. 19(A) and (B), the data of data bus signal line D1 is always switched at timing t1.

In contrast, the data of data bus signal line D2 are switched at timing t1 if, referring to FIG. 19(A), the data of data bus signal line D1 and data bus signal line D2 are the same in interval N; and the data of data bus signal line D2 are switched at timing t2 if, referring to FIG. 19(B), the data of data bus signal line D1 and data bus signal line D2 are different in interval N. This point is a characteristic feature of the present embodiment, this provision enabling an effective reduction of the charge consumption.

The logic of the data of data bus signal line D1 in interval N, the logic of the data of data bus signal line D2 in interval N, the logic of the data of data bus signal line D1 in interval N+1, and the logic of the data of data bus signal line D2 in interval N+1 can each be either "High" or "Low." Accordingly, combinations of this logic can take sixteen forms.

Returning to FIG. 18, input/output circuit 12 supplies data DATA1 of data bus signal line D1 to input/output pad 11 at timing ck3 that is synchronized with the external clock signal. Input/output circuit 12 next supplies data DATA2 of data bus signal line D2 to input/output pad 11 at timing ck3*d* that is delayed one-half cycle from the external clock signal.

FIG. 20 is a table showing the charge that is consumed by the charge and discharge of coupling capacitance C for each of the sixteen combinations of logic in FIG. 19. In the table of FIG. 20, a combination number (No.) has been conferred to each of the combinations. In addition, "L" indicates the "Low" level, i.e., reference voltage Vss, and "H" indicates the "High" level, i.e., power supply voltage Vdd. The difference in potential between power supply voltage Vdd and reference voltage Vss is V, and the capacitance of the coupling capacitance is C. Further, data do not switch at timing t2 when data bus signal line D1 and D2 are the same in interval N, and the charge consumption is therefore noted as "–" in these columns.

Figures 9, 10:
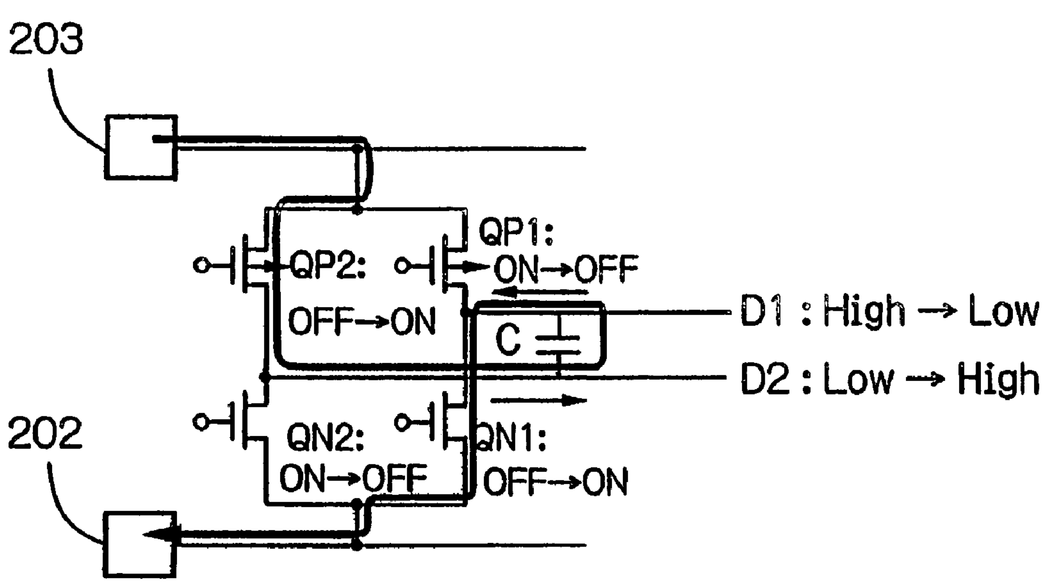
FIG. 9 is a table showing the charge that is consumed by the charge and discharge of coupling capacitance C for each of the sixteen combinations of logic in FIG. 8.
FIG. 10 shows the flow of charge in pattern 3.
Figure 11:
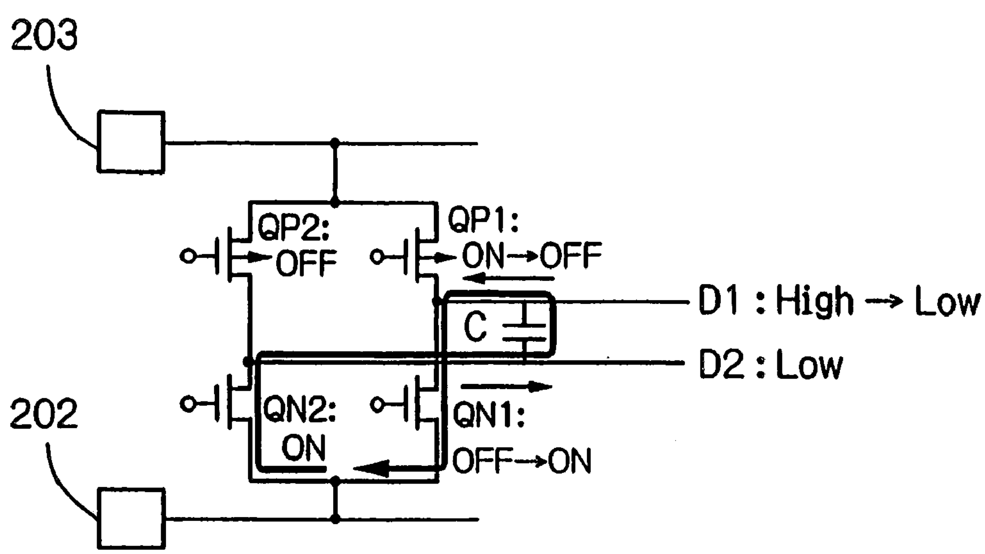
FIG. 11 shows the flow of charge in pattern 5.
Figure 12:
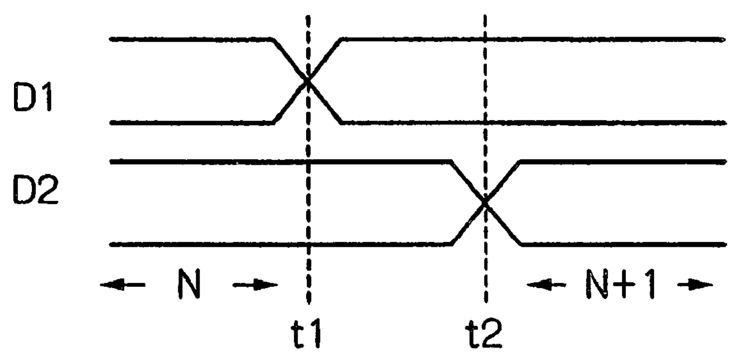
FIG. 12 is a timing chart showing the relations between data bus signal lines D1 and D2 in the operations that are shown in FIGS. 3(A) and (B)

FIG. 20 of the present embodiment is compared with FIGS. 9 and 13 of the prior art. The power consumption of combination Nos. 6 and 11 is 0·CV in FIG. 9 and 1·CV in FIG. 13 respectively of the prior art. In the present embodiment, however, data bus signal line D1 and data bus signal line D2 are the same in interval N, and the data of data bus signal lines D1 and D2 therefore both switch at timing t1. Thus, as shown in FIG. 20, the charge consumption in the present embodiment is 0·CV, as in FIG. 9.

Figure 1:
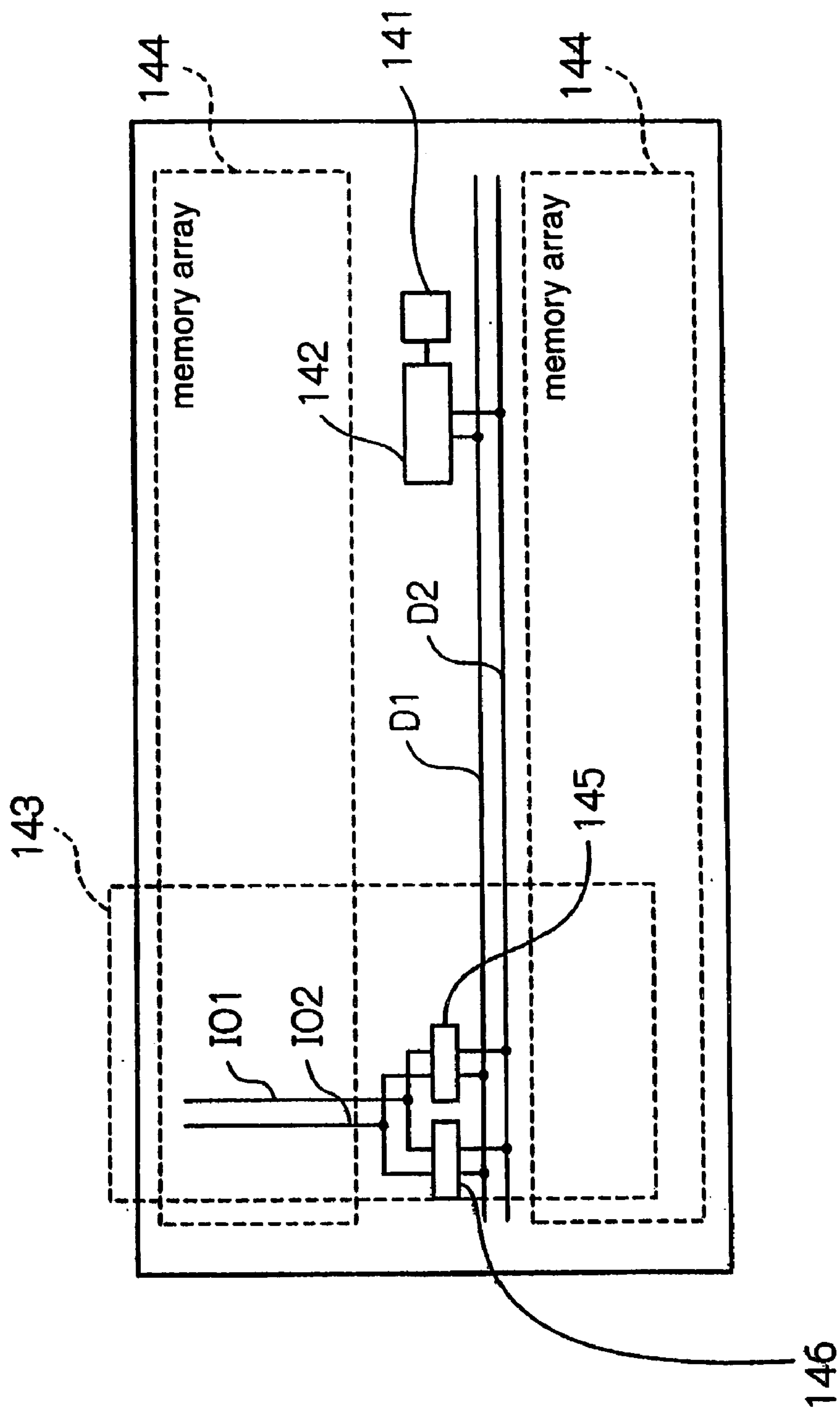
FIG. 1 shows a semiconductor memory device of the prior art.

The charge consumption in combination Nos. 7 and 10 was 2·CV in FIG. 9, and 1·CV in FIG. 13 respectively of the prior art. In the present embodiment, data bus signal line D1 and data bus signal line D2 differ in interval N, and data bus signal line D1 therefore switches at timing t1 and data bus signal line D2 switches at timing t2. As a result, as shown in FIG. 20, the charge consumption in the present embodiment is 1·CV, as in FIG. 13.

In this way, the charge consumption in combination Nos. 6, 7, 10, and 11 in the present embodiment is the same as the lower charge consumption in FIG. 9 or FIG. 13. Thus, if the sixteen combinations are assumed to occur at random in data bus signal lines D1 and D2 in the present embodiment, the average charge that is consumed by the charge and discharge of the coupling capacitance C in a single operation is $(6/16)\cdot CV=0.375$ CV. In other words, the present embodiment enables a reduction of the charging/discharging current of coupling capacitance C to ¾ that of the prior art (FIG. 9 and FIG. 13).

The present embodiment is next compared with the data bus inversion technique of the prior art. As previously described, in the data bus inversion technology, data that are currently supplied as output are compared with data that are to be supplied next. For this purpose, data that are to be supplied as output in interval N+1 are first established, a comparison operation is carried out based on these data, and then the data are switched. The timing at which data are finally supplied as output is therefore delayed to this extent. In the present embodiment, in contrast, the timing at which data are switched in interval N+1 is calculated based on the data of interval N, and the present embodiment therefore allows data to be transferred at a higher rate than in the data bus inversion technique of the prior art.

As described hereinabove, in the present embodiment, timing generation circuit 23 compares the data of data bus signal line D1 and data bus signal line D2 that are arranged adjacent to each other before the next data are supplied as output, and in accordance with the results of comparison, supplies timings to control circuits 21 and 22 such that the charge and discharge current of coupling capacitance C is reduced. The data of data bus signal lines D1 and D2 are switched at the timings that have been supplied to control circuits 21 and 22, respectively. Thus, a configuration realized by making only a slight modification to the circuit of the prior art allows selection of the optimum timing based on the data of interval N and switching of the data of interval N+1, whereby the current consumption resulting from the charge and discharge of coupling capacitance C can be effectively reduced (to ¾).

Although explanation in the present embodiment has focused on the read circuit and operations, the present invention can also be applied to write operations. Since input/output circuit 12 supplies data to data bus signal lines D1 and D2 in write operations, the present invention is applied to input/output circuit 12. When supplying data from input/output pad 11 to data bus signal lines D1 and D2 that are arranged adjacent to each other, input/output circuit 12 selects the timing for data output based on the immediately preceding (for example, the immediately preceding rise timing of the external clock signal) data of data bus signal lines D1 and D2. If the immediately preceding data of data bus signal line D1 and data bus signal line D2 are the same, input/output circuit 12 should simultaneously switch the data of data bus signal lines D1 and D2. On the other hand, if the immediately preceding data of data bus signal line D1 and data bus signal line D2 are different, input/output circuit 12 should switch the data of data bus signal line D1 and data bus signal line D2 at different timings. By these operations, the current consumption resulting from charge and discharge of coupling capacitance C can be reduced in write operations in the same way that is reduced in read operations.

Explanation next regards another embodiment of the present invention with reference to the accompanying figures.

In the semiconductor memory device of the present embodiment, if the present data of data bus signal line D1 and data bus signal line D2 are the same, data bus signal line D2 is placed in a floating state when the data of data bus signal line D1 are switched, following which the data of data bus signal line D2 are switched. Further, in the semiconductor memory device of the present embodiment, if the present data of data bus signal line D1 and data bus signal line D2 are different, the driving of the data of data bus signal line D2 is continued without change when the data of data bus signal line D1 are switched, following which the data of data bus signal line D2 are switched. This is the point of difference between the present embodiment and the semiconductor memory device of FIG. 14.

Figure 21:
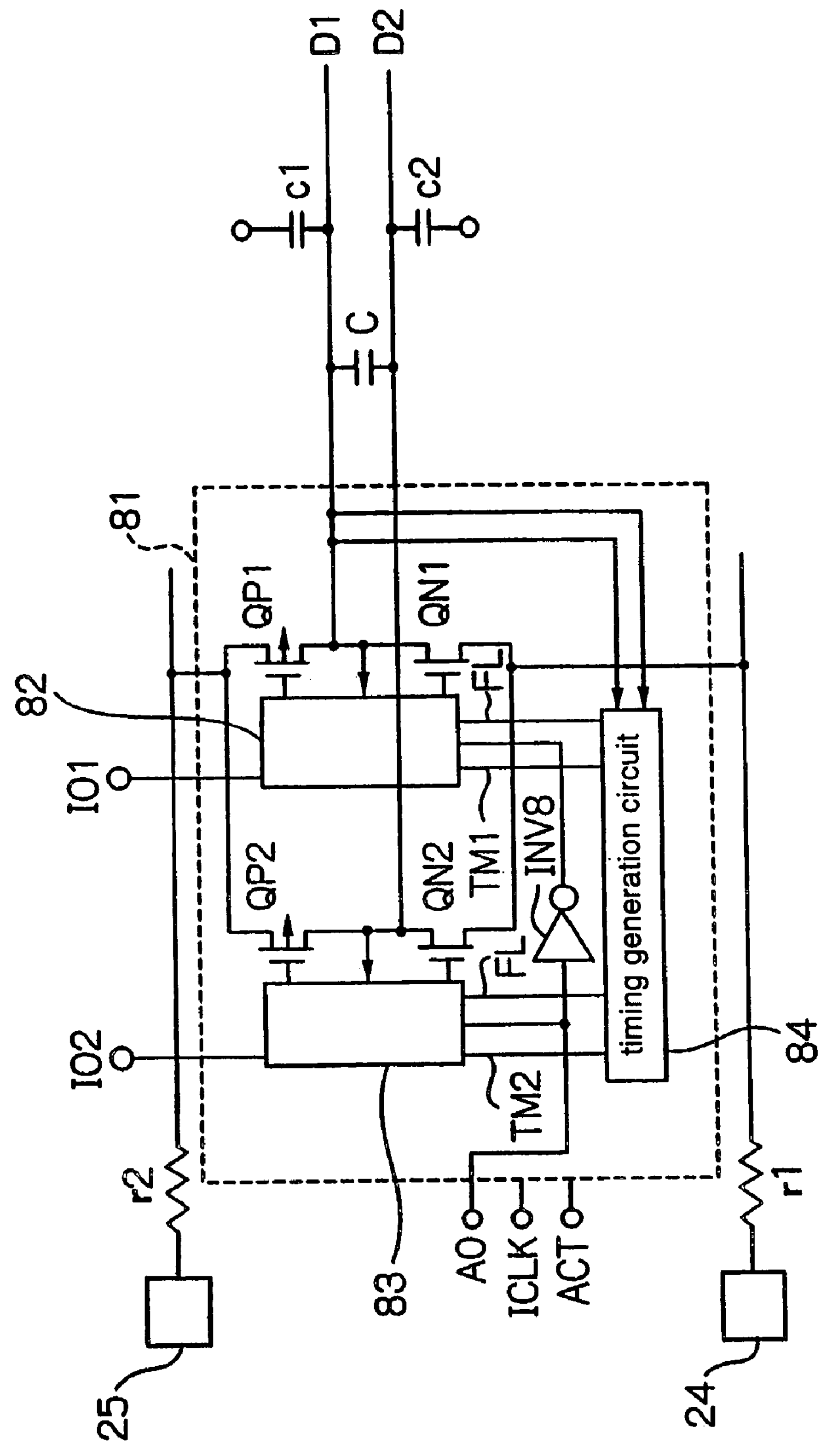
FIG. 21 shows the read circuit of another embodiment of the present invention.

The configuration of the semiconductor memory device of the present embodiment is the same as shown in FIG. 14. In the present embodiment, the configuration of the read circuit is different from that shown in FIG. 15. FIG. 21 shows the configuration of the read circuit of another embodiment of the present invention. The signal line drive circuit that is included in the read circuit of FIG. 21 has the same configuration as the circuit shown in FIG. 16. Referring to FIG. 21, read circuit 81 includes: signal line drive circuit 31, control circuits 82 and 83, timing generation circuit 84, and inverter INV8.

Internal clock signal ICLK, activation signal ACT, and address signal A0 are applied as input to read circuit 81. Address signal A0 is supplied to control circuit 83. Inverter INV8 inverts address signal A0 and supplies the inverted signal to control circuit 82. The level of data bus signal line D1 is applied as input to control circuit 82, and the level of data bus signal line D2 is applied as input to control circuit 83. Timing generation circuit 84 further supplies timing signals TM1 and TM2 to control circuits 82 and 83, respectively, and also supplies signal FL to both control circuits 82 and 83.

Figure 22:
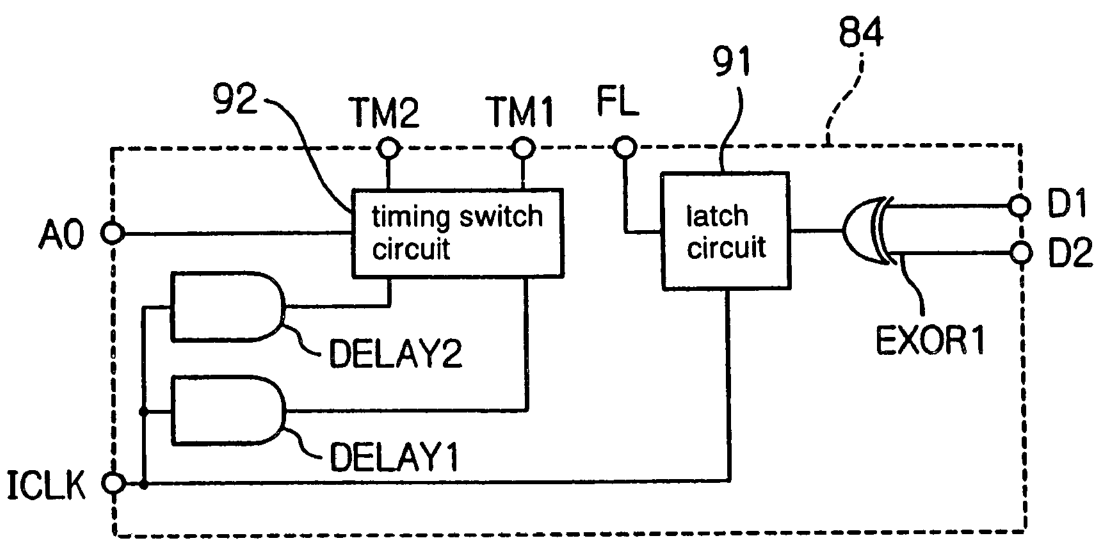
FIG. 22 shows the details of the timing generation circuit that is shown in FIG. 21.

FIG. 22 shows the details of the timing generation circuit that is shown in FIG. 21. Referring to FIG. 22, timing generation circuit 84 includes: delay circuits DELAY1 and DELAY2, EXCLUSIVE-OR circuit EXOR1, latch circuit 91, and timing switch circuit 92.

Delay circuit DELAY1 is the same as the circuit shown in FIG. 17, and supplies timing t1 to timing switch circuit 92. Delay circuit DELAY2 is also the same as the circuit shown in FIG. 17 and supplies timing t2 to timing switch circuit 92. EXCLUSIVE-OR circuit EXOR1 is also the same as the circuit shown in FIG. 17 and takes the EXCLUSIVE-OR of the data of data bus signal line D1 and data bus signal line D2 and supplies these data to latch circuit 91.

Latch circuit 91 latches the output of EXOR1 in synchronization with internal clock signal ICLK and supplies latched signal FL to control circuits 82 and 83. Timing switch circuit 92 supplies timing signals that have been generated based on timings t1 and t2 and signal A0 to control circuits 21 and 22.

It is here assumed that the least significant bit A0 of the address signal is "Low." Timing switch circuit 92 supplies a timing signal that is timing t1 to control circuit 82, and supplies a timing signal that is timing t2 to control circuit 83.

Figure 23:
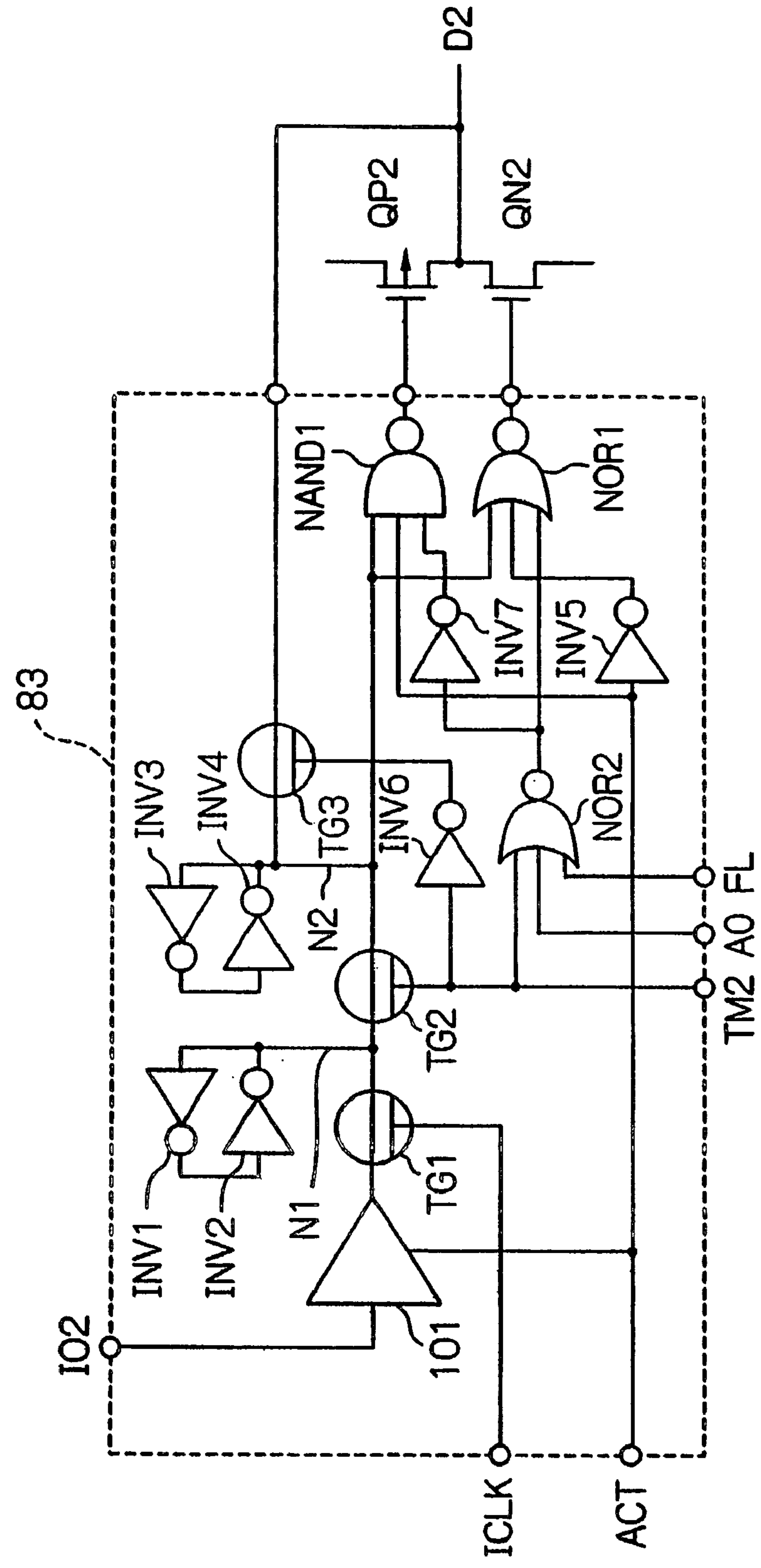
FIG. 23 shows the details of the control circuit that is shown in FIG. 21.

FIG. 23 shows the details of the control circuit that is shown in FIG. 21. Control circuit 82 and control circuit 83 have the same configuration. However, while address signal A0 and timing signal TM2 are applied as input to control circuit 83, the inversion of address signal A0 and timing signal TM1 are applied as input to control circuit 82. FIG. 23 shows an example of control circuit 83.

Referring to FIG. 23, control circuit 83 includes: amplifier 101, transfer gates TG1–3, inverters INV1–7, NAND circuit NAND1, and NOR circuits NOR1 and NOR2.

Amplifier 101 is activated by activation signal ACT, amplifies the signal of I/O bus signal line IO2, and supplies the amplified signal to transfer gate TG1. Transfer gate TG1 turns ON when internal clock signal ICLK is activated. The circuit that is made up from inverters INV1 and INV2 holds the value of node N1 that is connected to the output of transfer gate TG1. The output of transfer gate TG1 is supplied to transfer gate TG2. Transfer gate TG2 turns ON when timing signal TM2 from timing generation circuit 84 is activated. The circuit that is made up from inverters INV3 and INV4 holds the value of node N2 that is connected to the output of transfer gate TG2. NOR circuit NOR2 obtains the NOR logic of timing signal TM2, address signal A0, and signal FL. Inverter INV5 inverts activation signal ACT and applies the inverted signal to NOR circuit NOR1. Inverter INV6 inverts timing signal TM2 and controls transfer gate TG3. Inverter INV7 inverts the output of NOR circuit NOR2, and NAND circuit NAND1 obtains the NAND logic of the value of node N2, activation signal ACT, and the inverted value of the output of NOR circuit NOR2, and supplies the NAND logic to the gate of transistor QP2. NOR circuit NOR1 obtains the NOR logic of the value of node N2, the inverted value of activation signal ACT, and the output of NOR circuit NOR2 and supplies the obtained NOR logic to the gate of transistor QN2. Transfer gate TG3 takes the value of data bus signal line D2 as input, turns ON when timing signal TM2 is deactivated, and supplies the value of data bus signal line D2 to node N2.

In particular, control circuit 83 of the configuration of FIG. 23 is provided with the capabilities to, when the output of NOR circuit NOR2 becomes "High," forcibly turn OFF transistor QN2 and transistor QP2 and place data bus signal line D2 in a floating state. The state in which the output of NOR circuit NOR2 becomes "High" occurs in an interval in which: address signal A0 is "Low"; and further, when output signal FL is "Low," i.e., when a value indicating that data bus signal line D1 and data bus signal line D2 are the same is latched in latch circuit 91; and moreover, when timing signal TM2 that precedes timing t2 is inactive.

Regarding the operation of control circuit 83, amplifier 101 is activated when activation signal ACT is activated. A microvoltage is supplied as output from the memory array during reading to I/O bus signal line IO2, but this voltage is amplified to a logic level by amplifier 101.

When activation signal ACT is activated, transistor QN2 or transistor QP2 turns ON in accordance with the value of node N2, and data bus signal line D2 is driven.

When internal clock signal ICLK is activated, transfer gate TG1 turns ON and the output of amplifier 101 is transferred to node N1.

Transfer gate TG2 next turns ON in accordance with the timing signal from timing generation circuit 84 and the value of node N1 is transferred to node N2. The output of transfer gate TG2 is supplied by way of NAND circuit NAND1 and NOR circuit NOR1 to the gates of transistor QN2 and transistor QP2.

When activation signal ACT is activated and when the output of NOR circuit NOR2 is "Low," transistor QN2 or transistor QP2 turns ON in accordance with the value of node N2 and data bus signal line D2 is driven. Alternatively, when the output of NOR circuit NOR2 is "High," transistor QN2 and transistor QP2 turn OFF and data bus signal line D2 enters a floating state.

To state further, if the data of data bus signal line D1 and data bus signal line D2 are different in the immediately preceding interval, data bus signal line D2 continues to be driven in the interval that precedes timing t2 at the same logic as the data of data bus signal line D2 of the immediately preceding interval; and if the data of data bus signal line D1 and data bus signal line D2 are the same in immediately preceding interval, data bus signal line D2 is placed in a floating state in the interval that precedes timing t2.

Figure 24:
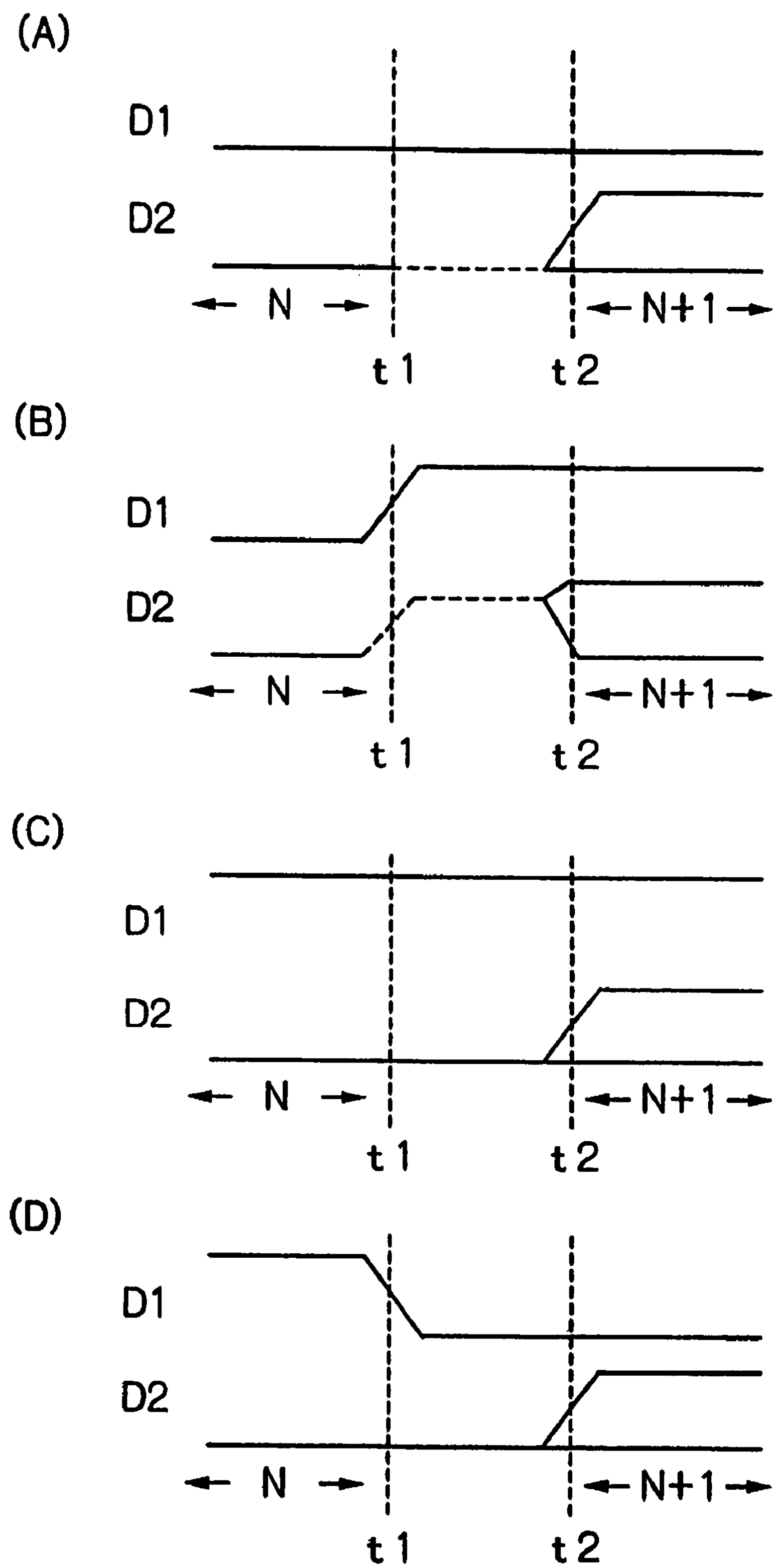
FIG. 24 is a timing chart showing the relations of the data bus signal lines D1 and D2 at the time of read operations by the read circuit that is shown in FIG. 21.

FIG. 24 is a timing chart showing the relation between data bus signal lines D1 and D2 during read operations by the read circuit that is shown in FIG. 21. The portion in which the data level is indicated by a dotted line in FIG. 24 indicates a floating state, i.e., transistor QN2 and transistor QP2 that are serially connected are both OFF.

Referring to FIG. 24(A), the data of data bus signal line D1 and data bus signal line D2 in interval N are both "L." Since the data of data bus signal line D1 and data bus signal line D2 in interval N are the same, at timing t1, data of interval N+1 are supplied in data bus signal line D1 and data bus signal line D2 is placed in a floating state.

FIG. 24(A) shows a case in which the data of data bus signal line D1 of interval N+1 are "L." Data bus signal line D2 is in a floating state, and the data of data bus signal line D1, which is the antipode of the coupling capacitance C, does not change at timing t1. As a result, data bus signal line D1 is maintained at the reference voltage Vss, i.e., "L." Then, at timing t2, data bus signal line D2 is driven by the data of interval N+1. If the data are "H," data bus signal line D2 changes to power supply voltage Vdd, i.e., "H"; but if the data are "L," data bus signal line D2 is maintained at reference voltage Vss.

Referring to FIG. 24(B), the data of data bus signal line D1 and data bus signal line D2 in interval N are both "L." Since the data of data bus signal line D1 and data bus signal line D2 of interval N are the same, data of interval N+1 are supplied as output to data bus signal line D1 at timing t1 and data bus signal line D2 is placed in a floating state.

In FIG. 25(B), "H" data are supplied as output to data bus signal line D1 at timing t1 and the level of data bus signal line D2 is raised by coupling capacitance C. Data bus signal line D2 is then driven by the data of interval N+1 at timing t2. Data bus signal line D2 is raised to power supply voltage Vdd if the data of interval N+1 are "H," and data bus signal line D2 is drawn down to reference voltage Vss if the data are "L."

If it is assumed that all of the wiring capacitance of data bus signal lines D1 and D2 is coupling capacitance C, data bus signal line D2 rises to power supply voltage Vdd, the same level as data bus signal line D1, when "H" data are supplied as output to data bus signal line D1 at timing t1. In actuality, however, parasitic wiring capacitances c1 and c2 exist in data bus signal lines D1 and D2 in addition to coupling capacitance C, and the level of data bus signal line D2 therefore rises to a level that is lower than power supply voltage Vdd.

Referring to FIG. 24(C), in interval N, the data of data bus signal line D1 are "H" and the data of data bus signal line D2 are "L." Since the data of data bus signal line D1 and data bus signal line D2 in interval N are different, data of interval N+1 are supplied as output to data bus signal line D1 at timing t1, and data bus signal line D2 continues to be driven by the data of interval N.

In FIG. 24(C), the data of interval N+1 of data bus signal line D1 are "H," and data bus signal line D1 is therefore maintained at power supply voltage Vdd. Data of interval N+1 are then supplied as output to data bus signal line D2 at timing t2. If the data of interval N+1 of data bus signal line D2 are "H," the level of data bus signal line D2 changes, but if the data are "L," the level of data bus signal line remains unchanged.

Referring to FIG. 24(D), in interval N, the data of data bus signal line D1 are "H" and the data of data bus signal line D2 are "L." Since the data of data bus signal line D1 and data bus signal line D2 are different in interval N, data of interval N+1 are supplied as output to data bus signal line D1 at timing t1 and data bus signal line D2 continues to be driven by data of interval N.

In FIG. 24(D), the data of data bus signal line D1 in interval N+1 are "L" and the level of data bus signal line D1 therefore changes. The data of interval N+1 are then supplied as output to data bus signal line D2 at timing t2. The level of data bus signal line D2 changes if the data of data bus signal line D2 in interval N+1 are "H", and do not change if the data are "L."

FIG. 25 is a table showing the charge that is consumed by the charge and discharge of coupling capacitance C in each of the sixteen combinations of logic in FIG. 24.

Comparing the table of FIG. 25 with the table of FIG. 20, in combinations in which the data of data bus signal line D1 and data bus signal line D2 in interval N differ, the charge consumption at timing t1, timing t2, and the sum of timing t1 and timing t2 are all the same. This similarity results from the absolutely identical operations of read circuit 81 of FIG. 21 and read circuit 15 of FIG. 15 when the data of data bus signal line D1 and data bus signal line D2 are different in interval N.

In combinations in which the data of data bus signal line D1 and data bus signal line D2 in interval N are the same, the charge consumption at timing t1 in the table of FIG. 20 is the same as the charge consumption at timing t2 in the table of FIG. 25. The reason for this similarity is that in read circuit 81 of FIG. 21, when data bus signal line D2 is in the floating state at timing t1, charging and discharging of coupling capacitance C does not occur and the charge consumption is 0·CV, but when data bus signal line D2 is driven at timing t2, charging and discharging do occur. In actuality, parasitic wiring capacitance c1 and c2 exist in addition to coupling capacitance C in data bus signal lines D1 and D2, and the charge that is consumed in the charge and discharge of coupling capacitance C at timing t1 therefore does not completely account for 0·CV, but this charge consumption represents the charge used in the charge and discharge of the capacitance in which coupling capacitance C and wiring capacitance c2 are connected in a series, and the charge consumption is therefore very small.

According to the present embodiment, if it is assumed that the sixteen combinations occur randomly in data bus signal lines D1 and D2, the average charge that is consumed by the charge and discharge of the coupling capacitance C in a single operation is $(6/16)\cdot CV=0.375$ CV. This value is the same as that of the circuit shown in FIG. 15 and represents a reduction to ¾ of the prior art (FIGS. 9 and 13). In other words, the present embodiment enables a reduction of the current that is consumed by charge and discharge of coupling capacitance C to ¾ that of the prior art.

In addition, referring to FIG. 25, the charge that is consumed by the charge and discharge of coupling capacitance C at timing t1 is 0·CV in all of the sixteen combinations. Thus, according to the present embodiment, the peak current resulting from the charge and discharge of coupling capacitance C does not occur at timing t1 at which high-speed data transfer is required in a read operation. In other words, the power source noise is negligible, and high-speed data transfer is therefore possible.

The present embodiment is next compared with the data bus inversion technique of the prior art. In the present embodiment, as with the read circuit of FIG. 15, the method of output of data to data bus signal lines D1 and D2 is determined based on the data of interval N, and the present embodiment is capable of transferring data at a higher rate than the data bus inversion technique of the prior art.

As explained in the foregoing description, in the present embodiment, timing generation circuit 84 compares the data of data bus signal line D1 and data bus signal line D2 that are arranged adjacent to each other before next supplying data as output, and supplies the results of comparison to control circuits 82 and 83. Control circuits 82 and 83 supply data to data bus signal lines D1 and D2 by an output method that accords with the results of comparison. As a result, the present embodiment enables a configuration that entails only a minor modification of the circuit of the prior art to, based on the data of interval N, select the optimum output method for reducing the charge and discharge of coupling capacitance C and then supply the data of interval N+1. The present embodiment can therefore effectively reduce the current consumption resulting from the charge and discharge of coupling capacitance C.

Although explanation has focused on the read circuit and read operations in the present embodiment, the present invention can also be applied to write operations. In write operations, input/output circuit 12 supplies data as output to data bus signal lines D1 and D2, and the present invention is therefore applied to input/output circuit 12. When supplying data to data bus signal lines D1 and D2 that are arranged adjacent to each other, input/output circuit 12 should select the data output method based on the immediately preceding data of data bus signal lines D1 and D2 (for example, the timing of the immediately preceding rise of the external clock signal). In this way, the current consumption resulting from the charge and discharge of coupling capacitance C can be reduced in write operations as well as in read operations.

Although explanation thus far has regarded two adjacent data buses that make up a pair as the embodiments of the present invention, an actual semiconductor memory device typically has a plurality of circuits that correspond to a single input/output pad, as shown in FIG. 14. In such a case, there is a plurality of pairs composed of the data bus signal lines D1 and D2 shown in FIG. 14 and these pairs are arranged adjacent to each other.

FIG. 26 shows an example of the wiring layout having a plurality of pairs of data bus lines. In FIG. 26, data bus signal line D1A and data bus signal line D2A are data bus signal lines that make up a pair that corresponds to one input/output pad. Similarly, data bus signal line D1B and data bus signal line D2B are data bus signal lines that make up a pair that corresponds to one input/output pad. Data bus signal line D1C and data bus signal line D2C are data bus signal lines that make up a pair that corresponds to one input/output pad.

S1 is the spacing between data buses that make up pairs, and S2 is the spacing between data buses of different pairs that are adjacent to each other. C1 is the coupling capacitance when the spacing between adjacent interconnections is S1, and C2 is the coupling capacitance when the spacing is S2. If, for the sake of simplification in this case, it is assumed that the wiring lengths of all data buses are identical, coupling capacitances C1 and C2 will be inversely proportional to the wiring spacing S1 and S2.

Such effects as the reduction of current consumption and the reduction of power source noise result from the coupling capacitance between the wiring of data buses that make up pairs, i.e., coupling capacitance C1 in FIG. 26. Accordingly, to obtain a greater effect of the present invention requires only an increase in inter-wiring spacing S2. For example, if spacing S2 between data buses of different pairs is made infinitely wide, coupling capacitance C2 becomes 0, as shown in FIG. 14. However, increasing the spacing between wiring without limit is impossible in an actual semiconductor memory device.

The sum of the inter-wiring spacing S1 and S2 is here set to a fixed width S. Coupling capacitance C1 is cut to ¾ by means of the effect of reducing the current that is charged and discharged. In contrast, there is no effect upon reducing coupling capacitance C2. As a result, the sum of the charge consumption of coupling capacitance C1 and the charge consumption of coupling capacitance C2 is proportional to $(3/4)\cdot(1/S1)+1\cdot(1/S2)$. In this equation, charge consumption becomes a minimum when $S1=S\cdot(-3+2\sqrt{3})$ and $S2=S\cdot(4-2\sqrt{3})$. In other words, to reduce the total current consumption in an actual typical semiconductor memory device, S1 is preferably less than S2, and ideally: S1:S2=0.46:0.54

Figure 2:
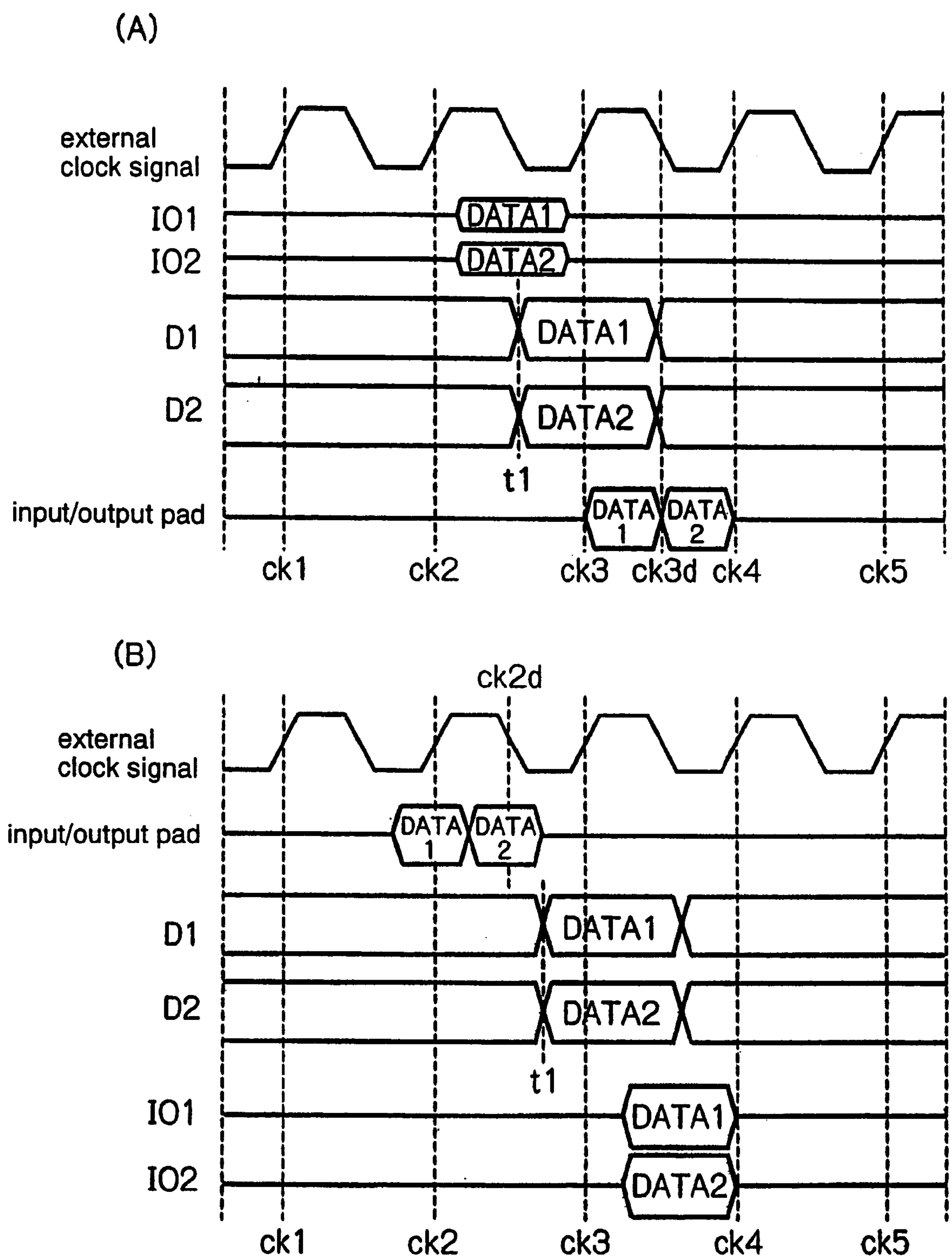
FIG. 2 is a timing chart showing the operations of the semiconductor memory device of the prior art that is shown in FIG. 1.
Figure 4:
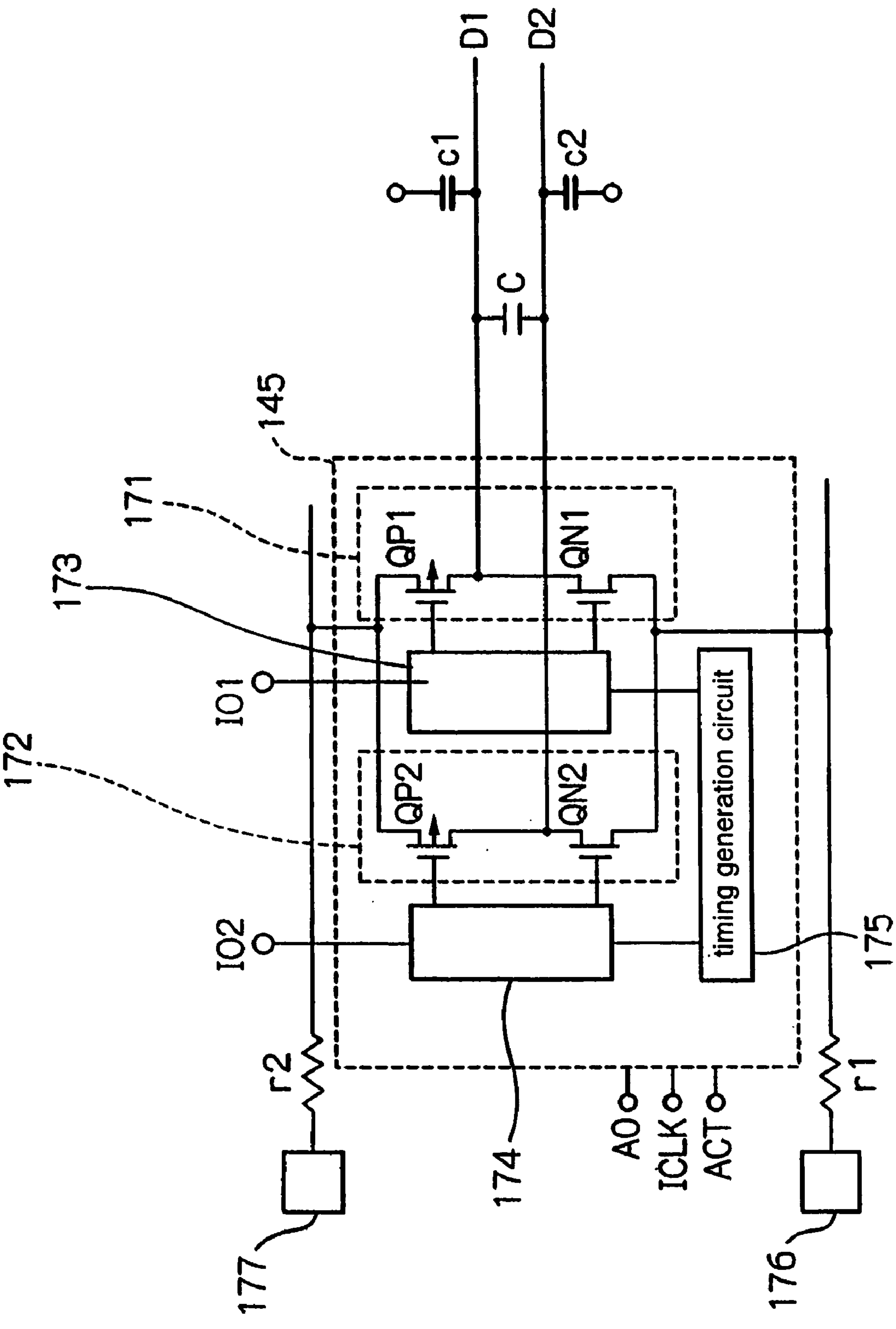
FIG. 4 shows an example of the typical configuration of the read circuit that is shown in FIG. 1.
Figure 5:
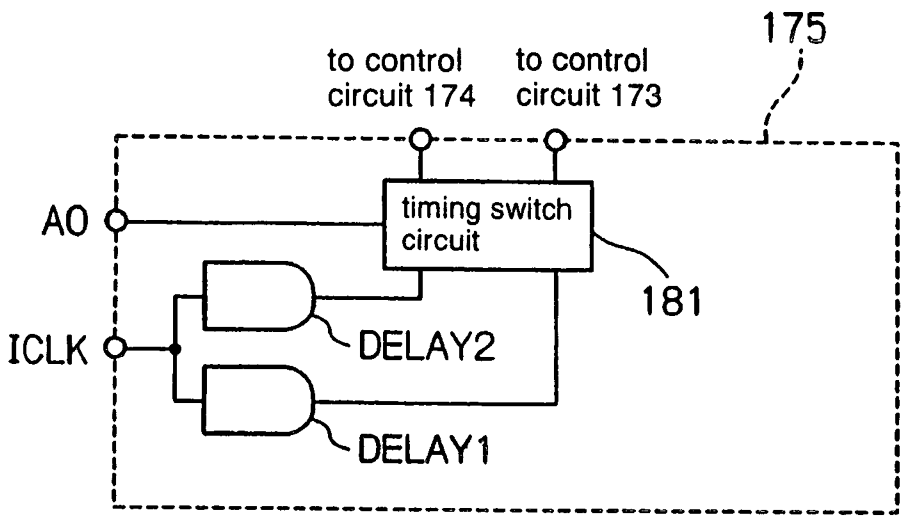
FIG. 5 shows the details of the timing generation circuit that is shown in FIG. 4.
Figure 6:
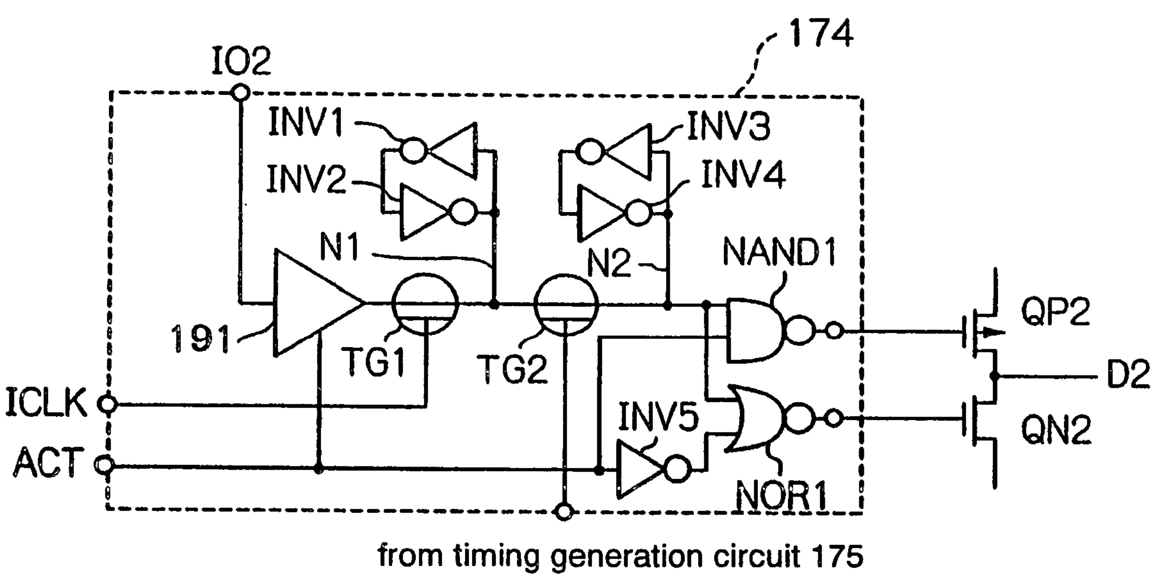
FIG. 6 shows the details of the control circuit that is shown in FIG. 4.
Figure 7:
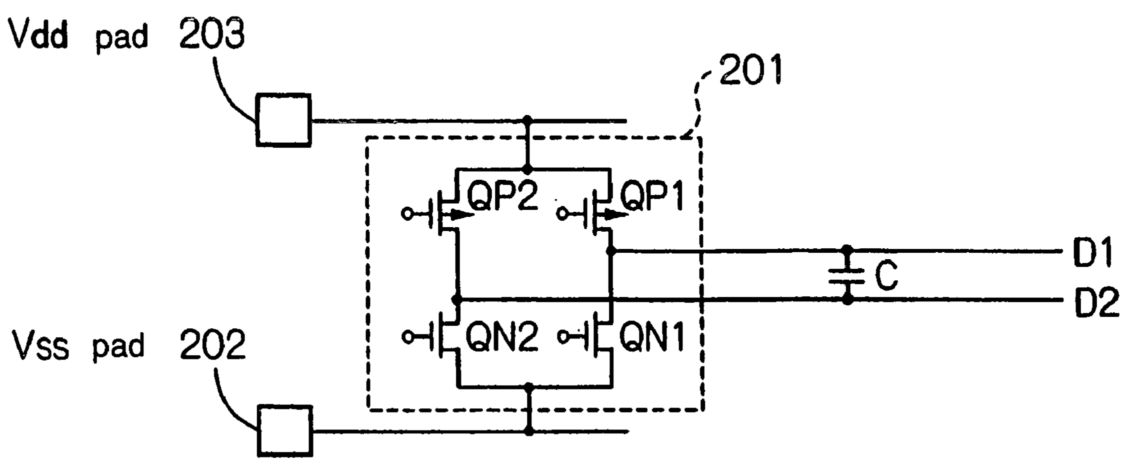
FIG. 7 shows a simplified circuit of the read circuit that is shown in FIG. 4.
Figure 8:
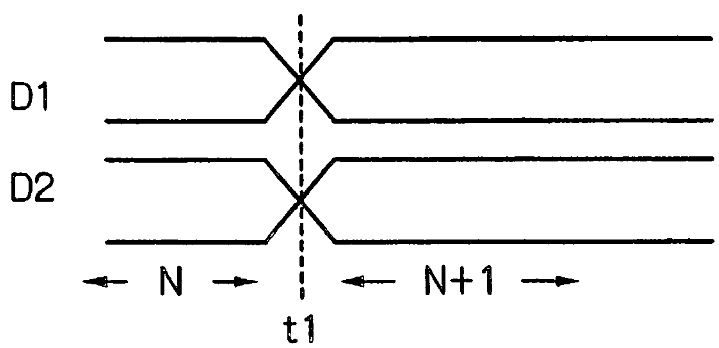
FIG. 8 is a timing chart showing the relations between data bus signal lines D1 and D2 in the operations that are shown in FIGS. 2(A) and (B)

In contrast, when the operation of a semiconductor memory device of the prior art that is shown in FIGS. 2 and 3 is applied to the wiring layout of FIG. 26, the effect of the reduced charging and discharging of current is not obtained, and the sum of the charge consumption of coupling capacitance C1 and the charge consumption of coupling capacitance C2 is proportional to $1\cdot(1/S1)+1\cdot(1/S2)$. In this equation, the charge consumption is at a minimum when $S1=S\cdot(1/2)$ and $S2=S\cdot(1/2)$. In other words, if it is assumed that S1:S2 is 1:1, the total current consumption can be minimized.

If the minimized charge consumption in the above-described embodiment of the present invention is compared with the method of the prior art, the minimum charge consumption obtained by the embodiment of the present invention is approximately 0.87 that of the minimum charge consumption obtained by the prior art. In other words, a typical wiring layout according to the present invention having a plurality of data bus pairs can reduce the current consumption by approximately 13%.

As the embodiments of the present invention, explanation thus far has regarded a pair made up of two data buses in DDRI, i.e., in 2-bit prefetch operations. However, the present invention can also be applied to the four-bit prefetch of DDRII. In such cases, the set of four data buses of DDRII may be, for example, divided between two pairs to obtain the same effect.

The present invention may further be applied to the eight-bit prefetch of DDRIII. In such cases, as well, the set of eight data buses may be divided into four pairs each having two data buses to obtain the same effect.

As embodiments of the present invention, explanation has thus far regarded examples of application to the control of data buses, but the present invention is not limited to this form, and can be widely and generally applied.

In addition to the above-described points, when one or both of the two adjacent lines do not require the high-speed transfer of a signal, the application of the present invention can obtain high-speed operation and low power consumption. For example, the present invention can be used in a drive circuit for driving an address bus signal line.

A case can be considered in which, in the address lines in a semiconductor memory device, one address is used in a redundancy operation and another address should be transferred before the completion of the redundancy operation. In such a case, the two addresses are supplied to the semiconductor memory device at the same time, and the former address therefore requires high-speed signal transfer, but high speed is not required for the latter address. The present invention can be applied to such a case and can obtain the same effects as previously described.

While preferred embodiments of the present invention have been described using specific terms, such description is for illustrative purposes only, and it is to be understood that changes and variations may be made without departing from the spirit or scope of the following claims.

What is claimed is:

1. A signal line drive method for supplying signals to a first signal line and a second signal line that form a pair and that are arranged adjacent to each other; said method comprising steps of:

determining whether the current signals of said first signal line and said second signal line are the same or not;

selecting a drive procedure that results in less charge and discharge of current of coupling capacitance between said first signal line and said second signal line, according to whether the present signals of said first signal line and said second signal line are the same or not;

driving said first signal line and said second signal line in accordance with said drive procedure that has been selected to supply signals as output.

2. A signal line drive method according to claim 1, wherein:

if the present signals of said first signal line and said second signal line are the same, said first signal line and said second signal line are driven by a drive procedure that supplies the next signals as output at the same timing to said first signal line and said second signal line; and if the present signals of said first signal line and said second signal line are different, said first signal line and said second signal line are driven by a drive procedure that supplies the next signals to said first signal line and said second signal line at different timings.

3. A signal line drive method according to claim 1, wherein:

if the present signals of said first signal line and said second signal line are the same, said first signal line and said second signal line are driven by a drive procedure in which either one of said first signal line or said second signal line is first placed in a floating state and the next signal is supplied as output to the other signal line, following which the next signal is supplied as output to the signal line that was placed in the floating state;

if the present signals of said first signal line and said second signal line are different, said first signal line and said second signal line are driven by a drive procedure in which, first output of said present signal is continued to either one of said signal line or said second signal line while the next signal is supplied to the other signal line, following which the next signal is supplied as output to the signal line to which output of said present signal was continued.

4. A signal line drive circuit for supplying signals as output to a first signal line and a second signal line that make up a pair and that are arranged adjacent to each other, said circuit comprising:

a determination circuit f or determining whether the present signals of said first signal line and said second signal line are the same or not;

a control circuit for selecting a drive procedure that results in less charge and discharge of current of coupling capacitance between said first signal line and said second signal line depending on whether the present signals of said first signal line and said second signal line are the same or not; and a drive circuit for driving said first signal line and said second signal line in accordance with said drive procedure that has been selected by said control circuit so as to output signals.

5. A signal line drive circuit according to claim 4, wherein:

if the present signals of said first signal line and said second signal line are the same, said first signal line and said second signal line are driven by a drive procedure in which the next signals are supplied as output to said first signal line and said second signal line at the same timing; and if the present signals of said first signal line and said second signal line are different, said first signal line and said second signal line are driven by a drive procedure in which the next signals are supplied as output to said first signal line and said second signal line at different timings.

6. A signal line drive circuit according to claim 4, wherein:

if the present signals of said first signal line and said second signal line are the same, said first signal line and said second signal line are driven by a drive procedure in which either one of said first signal line or said second signal line is first placed in a floating state while the next signal is supplied as output to the other, following which the next signal is supplied as output to the signal line that was placed in a floating state; and if the present signals of said first signal line and said second signal line are different, said first signal line and said second signal line are driven by a drive procedure in which output of said present signal is first continued to either one of said first signal line or said second signal line while the next signal is supplied as output to the other, following which the next signal is supplied as output to the signal line to which the output of said present signal was continued.

7. A signal line drive circuit according to claim 4, wherein signal lines that make up a pair are arranged such that the spacing between said signal lines that make up a pair is smaller than the spacing with other signal lines.

8. A signal line drive circuit according to claim 5, wherein signal lines that make up a pair are arranged such that the spacing between said signal lines that make up a pair is smaller than the spacing with other signal lines.

9. A signal line drive circuit according to claim 6, wherein signal lines that make up a pair are arranged such that the spacing between said signal lines that make up a pair is smaller than the spacing with other signal lines.

10. A semiconductor memory device for storing data in a memory array, said semiconductor memory device comprising:

two data bus signal lines that make up a pair that are arranged adjacent to each other;

a read circuit for, during a read operation, driving said data bus signal lines in accordance with a drive procedure that has been selected in accordance with whether the present data of said two data bus signal lines are the same or not and that results in less charge and discharge of current of coupling capacitance between said two data bus signal lines, and for supplying data of said memory array as output to said data bus signal lines; and an input/output circuit for, during a write operation, supplying data from an input/output pad to said data bus signal lines.

11. A semiconductor memory device according to claim 10, wherein said read circuit supplies the next data as output to said two data bus signal lines at the same timing if the present data of said two data bus signal lines are the same, and supplies the next data as output to said two data bus signal lines at different timings if the present data of said two data bus signal lines are different.

12. A semiconductor memory device according to claim 10, wherein said read circuit, if the present data of said two data bus signal lines are the same, first supplies the next data as output to either one of said data bus signal lines while the other data bus signal line is placed in a floating state and then supplies the next data as output to the signal line that was placed in a floating state; and if the present data of said two data bus signal lines are different; first supplies the next data as output to either one of said data bus signal lines while the output of said present data is continued to the other data bus signal line and then supplies the next data as output to the signal line to which output of said present data was continued.

13. A semiconductor memory device according to claim 10, said semiconductor memory device being DDR memory that implements serial input and output of data to outside the device at said input/output pad, and that implements parallel input and output of data of said memory array.

14. A semiconductor memory device according to claim 10, wherein signal lines that make up a pair are arranged such that spacing between said signal lines that make up a pair is less than the spacing with other signal lines.

15. A semiconductor memory device for storing data in a memory array, said semiconductor memory device comprising:

two address bus signal lines that make up a pair and that are arranged adjacent to each other for designating memory cells of two bits in said memory array; and an address bus drive circuit for driving said address bus signal lines in accordance with a drive procedure that results in less charge and discharge current of coupling capacitance between said two address bus signal lines and that is selected according to whether the present values of said two address bus signal lines are the same or not, and supplying addresses that are supplied from outside the device to said address bus signal lines.

16. A semiconductor memory device according to claim 15, wherein said address bus drive circuit supplies the next values as output to said two address bus signal lines at the same timing if the present values of said two address bus signal lines are the same, and supplies the next values as output to said two address bus signal lines at different timings if the present values of said two address bus signal lines are different.

17. A semiconductor memory device according to claim 15, wherein said address bus drive circuit, if the present values of said two address bus signal lines are the same, first supplies the next values to either one of said address bus signal lines while the other address bus signal line is placed in a floating state and then supplies the next value as output to the signal line that was placed in the floating state; and if the present values of said two address bus signal lines are different, first supplies the next values as output to either one of said address bus signal lines while output of said present value is continued to the other address bus signal line, and then supplies the next value as output to the signal line to which the output of said present value was continued.

* * * * *